(12) United States Patent
Moriya et al.

(10) Patent No.: US 12,115,601 B2
(45) Date of Patent: Oct. 15, 2024

(54) METHOD OF APPLYING SOLID BRAZING MATERIAL, METHOD OF PRODUCING COATED WORKPIECE, APPLICATION APPARATUS, AND ROLL-SHAPED SOLID BRAZING MATERIAL

(71) Applicant: Harima Chemicals, Incorporated, Kakogawa (JP)

(72) Inventors: Satoshi Moriya, Hyogo (JP); Aoi Tazuru, Hyogo (JP); Daigo Kiga, Hyogo (JP)

(73) Assignee: Harima Chemicals, Incorporated, Kakogawa (JP)

( * ) Notice: Subject to any disclaimer, the term of this patent is extended or adjusted under 35 U.S.C. 154(b) by 559 days.

(21) Appl. No.: 17/421,941

(22) PCT Filed: Feb. 21, 2020

(86) PCT No.: PCT/JP2020/007075
§ 371 (c)(1),
(2) Date: Jul. 9, 2021

(87) PCT Pub. No.: WO2020/171207
PCT Pub. Date: Aug. 27, 2020

(65) Prior Publication Data
US 2022/0118540 A1    Apr. 21, 2022

(30) Foreign Application Priority Data
Feb. 22, 2019 (JP) .................................. 2019-030606

(51) Int. Cl.
*B23K 3/06* (2006.01)
*B23K 3/08* (2006.01)
*B23K 35/36* (2006.01)

(52) U.S. Cl.
CPC .............. *B23K 3/0623* (2013.01); *B23K 3/08* (2013.01); *B23K 3/082* (2013.01); *B23K 35/36* (2013.01)

(58) Field of Classification Search
None
See application file for complete search history.

(56) References Cited

U.S. PATENT DOCUMENTS 4,244,176 A * 1/1981 Shimizu ............... B65H 71/005
57/295
4,429,457 A 2/1984 Noguchi et al.
(Continued)

FOREIGN PATENT DOCUMENTS

CN 101104215 A 1/2008
CN 108746920 A 11/2018
(Continued)

OTHER PUBLICATIONS

International Search Report (PCT/ISA/210) with an English translation, and Written Opinion (PCT/ISA/237) mailed on May 12, 2020, by the Japanese Patent Office as the International Searching Authority for International Application No. PCT/JP2020/007075. (9 pages).

(Continued)

*Primary Examiner* — Alexander M Weddle
(74) *Attorney, Agent, or Firm* — BUCHANAN, INGERSOLL & ROONEY PC

(57) ABSTRACT

In an application method of a solid brazing material, while being rotated, the solid brazing material is brought into contact with an aluminum plate material, thereby applying the solid brazing material to the aluminum plate material.

9 Claims, 8 Drawing Sheets

(56) References Cited

U.S. PATENT DOCUMENTS

| | | | |
|---|---|---|---|
| 5,234,150 A * | 8/1993 | Yamamoto | H01L 21/4821 |
| | | | 228/102 |
| 5,781,846 A * | 7/1998 | Jossick | B23K 35/0227 |
| | | | 428/560 |
| 2002/0003161 A1 | 1/2002 | Kouno et al. | |
| 2008/0094775 A1* | 4/2008 | Sneh | H01G 9/055 |
| | | | 29/25.42 |
| 2016/0346878 A1 | 12/2016 | Muraoka et al. | |

FOREIGN PATENT DOCUMENTS

| | | | |
|---|---|---|---|
| EP | 1 679 146 A1 | 7/2006 | |
| JP | 2006116499 A | 5/2006 | |
| JP | 2008306068 A | 12/2008 | |
| JP | 2010225749 A | 10/2010 | |
| JP | 2013185877 A | 9/2013 | |
| JP | 2016221421 A | 12/2016 | |
| WO | 2018235906 A1 | 12/2018 | |

OTHER PUBLICATIONS

Yu, "Technical Manual of Mechanical Manufacturing Process Materials", Dec. 1992, vol. I, Chapter 5, pp. 311 (5 pages) (Cited in Office Action issued Feb. 10, 2023, in corresponding Chinese Patent Application No. 202080009932.6).

PCT International Preliminary Report on Patentability (Form PCT/IB/373 and PCT/ISA/237), with PCT Notification Concerning Transmittal of International Preliminary Report on Patentability, issued on Aug. 10, 2021, by the International Bureau of WIPO in corresponding International Application No. PCT/JP2020/007075, and an English translation of the Report (Form PCT/IB/326 and Form PCT/IB/338), 13 pages.

Extended European Search Report dated Oct. 24, 2022, issued by the European Patent Office in corresponding European Application No. 20759927.5 (10 pages).

* cited by examiner

2A

METHOD OF APPLYING SOLID BRAZING MATERIAL, METHOD OF PRODUCING COATED WORKPIECE, APPLICATION APPARATUS, AND ROLL-SHAPED SOLID BRAZING MATERIAL

TECHNICAL FIELD

The present invention relates to a method of applying a solid brazing material, a method of producing a coated workpiece, an application apparatus, and a roll-shaped solid brazing material. In particular, a method of applying a solid brazing material, a method of producing a coated workpiece including the applying method of the solid brazing material, an application apparatus for applying the solid brazing material, and a roll-shaped solid brazing material used for the applying method or the application apparatus.

BACKGROUND ART

Conventionally, it has been known that, when a metal member is brazed, flux is applied on the metal member to be brazed in order to remove oxides from the metal member.

In general, flux is used as a liquid composition. Thus, when the flux is applied to a part to be welded, the flux sometimes flows. Accordingly, it has been considered to make the flux in a solid or a paste in order to surely apply the flux to the part to be welded.

As an application method using solidified flux (solid brazing material), more specifically, there is a proposed method of applying a solid brazing material to an aluminum member by disposing a column-shaped solid brazing material at an intermediate position in a direction in which an aluminum member is conveyed and pressing the solid brazing material to the aluminum member being conveyed at a constant pressing force (for example, see Patent Document 1 below).

CITATION LIST

Patent Document
  Patent Document 1: International Patent Publication No. 2018/235906

SUMMARY OF THE INVENTION

Problem to be Solved by the Invention

Meanwhile, to apply a large amount of the solid brazing material to the aluminum member in the application method of Patent Document 1, it is necessary to enlarge the contact area in which the solid brazing material is in contact with the aluminum member. However, the larger the contact area of the solid brazing material becomes, the larger the frictional force becomes at the contact part of the solid brazing material and the aluminum member. Thus, the running stability is decreased.

The present invention is aimed to provide a method of applying a solid brazing material that can increase the application amount without enlarging the contact area, a method of producing a coated workpiece including the application method of the solid brazing material, an application apparatus for applying the solid brazing material, and a roll-shaped solid brazing material used for the application method or the application apparatus.

Means for Solving the Problem

The present invention [1] includes a method of applying a solid brazing material comprising: applying the solid brazing material to a workpiece by bringing the solid brazing material into contact with the workpiece being conveyed while rotating the solid brazing material.

In the method of applying a solid brazing material, the solid brazing material is brought into contact with a workpiece being conveyed while the solid brazing material is rotated. The rotation of the solid brazing material allows a more amount of the solid brazing material to be applied. Thus, even when the contact area of the solid brazing material with the workpiece is small, the amount of application can be increased.

The present invention [2] includes the method described in [1] above, wherein a rotation direction of the solid brazing material is opposite to a conveyance direction of the workpiece at a contact part at which the solid brazing material is in contact with the workpiece, or the rotation direction of the solid brazing material is identical to the conveyance direction of the workpiece at the contact part of the solid brazing material with the workpiece, and when the rotation direction and the conveyance direction are identical, a velocity ratio of a circumferential velocity of the solid brazing material to a conveyance velocity of the workpiece (the circumferential velocity of the solid brazing material/the conveyance velocity of the workpiece) is less than 1 or more than 1.

In the method of applying a solid brazing material, the amount of application can be increased when the rotation direction of the solid brazing material and the conveyance direction of the workpiece are opposite at the contact part of the solid brazing material and the workpiece, or the rotation direction of the solid brazing material and the conveyance direction of the workpiece are the same at the contact part of the solid brazing material, and the workpiece and the velocity ratio of the circumferential velocity of the solid brazing material to the conveyance velocity of the workpiece (the circumferential velocity of the solid brazing material/the conveyance velocity of the workpiece) is less than 1 or more than 1.

The present invention [3] includes the method described in [1] or [2] above, wherein the rotation direction of the solid brazing material is identical to the conveyance direction of the workpiece at the contact part of the solid brazing material with the workpiece and the velocity ratio satisfies a following expression (1), or the rotation direction of the solid brazing material is opposite to the conveyance direction of the workpiece at the contact part of the solid brazing material with the workpiece and the velocity ratio satisfies a following expression (2), and $$\text{velocity ratio} = (\text{amount of application}/A) + 1 \quad (1)$$

$$\text{velocity ratio} = (\text{amount of application}/A) - 1 \quad (2)$$

(in the expressions, A satisfies $0 < A \leq 70$, and a unit of A and the amount of application is $g/m^2$).

In the method of applying a solid brazing material, the velocity ratio satisfies the expression (1) or the expression (2) and thus the amount of application is surely increased.

The present invention [4] includes the method described in [2] or [3] above, wherein a rate of change of the velocity ratio is 30% or less In the method of applying a solid brazing material, the rate of change of the velocity ratio is 30% or less. Thus, a stable amount of application is maintained.

The present invention [5] includes the method described in any one of the above-described [1] to [4], wherein in response to reduction in the solid brazing material, a number of revolutions of the solid brazing material is increased and/or the conveyance velocity of the workpiece is deceased.

In the method of applying a solid brazing material, while the solid brazing material is applied to the workpiece, the diameter of the solid brazing material becomes small.

Incidentally, the smaller the diameter becomes, the smaller the amount of application for one revolution of the solid brazing material becomes. In other words, when the number of revolutions is constant, the amount of application is changed in response to the decrease in the solid brazing material.

On the other hand, in the method of applying a solid brazing material, the circumferential velocity of the solid brazing material is adjusted to be kept constant without decreasing (in other words, the number of revolutions is increased) in response to the decrease in the solid brazing material, and/or the conveyance velocity of the workpiece is decreased in response to the decrease in the solid brazing material. In this manner, even when the diameter of the solid brazing material gradually decreases, the amount of application is kept constant by the increase in the number of revolutions of the solid brazing material and/or the decrease in the conveyance velocity of the workpiece. As a result, a stable amount of application can be maintained.

The present invention [6] includes the method described in any one of the above-described [1] to [5], wherein a plurality of the solid brazing materials is disposed, and the plurality of the solid brazing materials is wholly or partially rotated and simultaneously brought into contact with the workpiece being conveyed to apply the solid brazing material to the workpiece.

In the method of applying a solid brazing material, a plurality of solid brazing materials is wholly or partially brought into contact with the workpiece being conveyed while the plurality of solid brazing materials is rotated.

The plurality of solid brazing materials is in contact with the workpiece being conveyed. Thus, a large amount of the solid brazing materials can be applied. Conversely, when the amount of application of the solid brazing materials is kept constant, the decrease rate of each of the solid brazing materials can be reduced. Thus, each of the solid brazing materials can be used longer.

The present invention [7] includes a method of producing a coated workpiece comprising: the method described in the above-described [1] to [6].

The method of producing a solid brazing material includes the application method of the solid brazing material. Thus, a coated workpiece with a small variation in the amount of application is produced.

The present invention [8] includes an application apparatus comprising: a rotating unit that rotates a roll-shaped solid brazing material; and a conveyance unit that conveys a long workpiece.

In the application apparatus, while a rotating unit rotates the solid brazing material, a conveyance unit conveys a long workpiece.

The rotation of the solid brazing material allows a large amount of the solid brazing material to be applied. Thus, even when the contact area of the solid brazing material with the workpiece is small, the amount of application can be increased.

The present invention [9] includes the application apparatus described in [8] above, comprising a control unit that controls the rotating unit and/or the conveyance unit so that a velocity ratio of a circumferential velocity of the solid brazing material to a conveyance velocity of the workpiece (the circumferential velocity of the solid brazing material/ the conveyance velocity of the workpiece) is in a predetermined range.

In the application apparatus, a control unit controls the rotating unit and/or the conveyance unit so that the velocity ratio is in a predetermined range.

Thus, the application apparatus can increase the amount of application and surely apply the solid brazing material.

The present invention [10] includes the application apparatus described in [9] above, further comprising a circumferential velocity detecting unit that detects the circumferential velocity of the solid brazing material, wherein the control unit controls the velocity ratio based on the circumferential velocity of the solid brazing material detected by the circumferential velocity detecting unit.

In the application apparatus, the control unit controls the velocity ratio in accordance with the circumferential velocity of the solid brazing material detected by the circumferential velocity detecting unit.

Thus, the application apparatus can surely apply a predetermined amount of the solid brazing material to the workpiece.

The present invention [11] includes the application apparatus in [9] or [10] above, further comprising a first thickness detecting unit that detects a thickness of the solid brazing material, wherein the control unit controls the velocity ratio based on the thickness of the solid brazing material detected by the first thickness detecting unit.

In the application apparatus, while the application of the solid brazing material to the workpiece continues, the diameter of the solid brazing material becomes small.

The smaller the diameter becomes, the smaller the amount of application for one revolution of the solid brazing material becomes. In other words, when the number of revolutions of the solid brazing material is constant, the amount of application changes in response to the decrease in the solid brazing material.

Meanwhile, in the application apparatus, the control unit controls the velocity ratio in accordance with the thickness of the solid brazing material detected by the first thickness detecting unit. In this manner, even when the diameter of the solid brazing material gradually decreases, the velocity ratio is controlled and the amount of application can be kept constant by the increase in the number of revolutions of the solid brazing material and/or the decrease in the conveyance velocity of the workpiece. As a result, a stable amount of application is maintained. to The present invention [12] includes the application apparatus described in any one of the above-described [9] to [11], further comprising a second thickness detecting unit that detects the thickness of the solid brazing material, wherein based on detection by the second thickness detecting unit, the control unit notifies that the thickness of the solid brazing material becomes a predetermined thickness and/or stops the rotation of the solid brazing material and/or the conveyance of the workpiece.

In the application apparatus, the control unit notifies that the thickness of the solid brazing material becomes a predetermined thickness and/or stops the rotation of the solid brazing material and/or the conveyance of the workpiece.

Thus, in the application apparatus, the solid brazing material can be replaced at an optimal timing before the solid brazing material runs out.

The present invention [13] includes the application apparatus described in any one of the above-described [9] to [12], comprising a pressing unit that presses the solid brazing material to the workpiece; and a pressing force detecting unit that detects a pressing force to the workpiece, wherein the control unit controls the pressing force based on the pressing force detected by the pressing force detecting unit so that the solid brazing material is pressed to the workpiece at a constant pressing force.

In the application apparatus, the control unit controls the pressing force in accordance with the pressing force detected by the pressing force detecting unit so that the solid brazing material is pressed to the workpiece at a constant pressing force.

Thus, in the application apparatus, even when the application reduces the thickness of the solid brazing material, the solid brazing material is brought into contact with the workpiece at a constant pressure. As a result, the solid brazing material is stably applied to the workpiece.

The present invention [14] includes the application apparatus described in [13] above, wherein the control unit keeps a rate of change of the pressing force at 30% or less.

In the application apparatus, the rate of change of the pressing force is 30% or less. Thus, a stable amount of application is maintained.

The present invention [15] includes the application apparatus described in any one of the above-described [8] to [14], further comprising application amount detecting means that detects an amount of application of the solid brazing material.

In the application apparatus, the control unit can control the velocity ratio and/or the pressing force of the solid brazing material to the workpiece in accordance with the amount of application of the solid brazing material detected by the application amount detecting means.

The present invention [16] includes a roll-shaped solid brazing material used in the method described in the above-described [1] to [6].

Because having a roll shape, the roll-shaped solid brazing material is suitably used for the application method of the solid brazing material.

The present invention [17] includes a roll-shaped solid brazing material set in the rotating unit in the application apparatus described in the above-described [8] to [15].

Because having a roll shape to be set in a rotating unit, the roll-shaped solid brazing material is suitably used in the above-described application apparatus.

The present invention [18] includes the roll-shaped solid brazing material described in the [16] or [17] above, comprising: an attachment member; and a solid brazing material disposed around the attachment member.

The roll-shaped solid brazing material includes the attachment member. Thus, even when the application reduces the thickness of the solid brazing material, the solid brazing material can maximally be used to its edge adjacent to the attachment member. As a result, the yield is improved.

The present invention [19] includes the roll-shaped solid brazing material described in [18] above, wherein the attachment member has a friction bushing mechanism.

The roll-shaped solid brazing material allows the solid brazing material to firmly be fixed to the attachment member and also allows the attachment member to firmly be fixed to the rotating unit.

Effects of the Invention

By the application method of the solid brazing material of the present invention, the solid brazing material is brought into contact with the workpiece being conveyed while the solid brazing material is rotated. Thus, even when the contact area of the solid brazing material with the workpiece is small, the amount of application can be increased.

The producing method of the coated workpiece of the present invention includes the application method of the solid brazing material of the present invention. Thus, the coated workpiece with a large amount of application can be produced.

In the application apparatus of the present invention, while the rotating unit rotates the solid brazing material, the conveyance unit conveys a long workpiece. Meanwhile, the solid brazing material is brought into contact with the workpiece. Thus, even when the contact area of the solid brazing material with the workpiece is small, the amount of application can be increased.

Because the roll-shaped solid brazing material of the present invention has a roll shape, the roll-shaped solid brazing material can suitably be used in the application apparatus and application method of the present invention.

BRIEF DESCRIPTION OF THE DRAWINGS

FIG. 6A is a plan view. FIG. 6B is a cross-sectional view.

FIG. 7A is a plan view. FIG. 7B is a cross-sectional view.

DESCRIPTION OF THE EMBODIMENTS

1. First Embodiment

Figure 1:
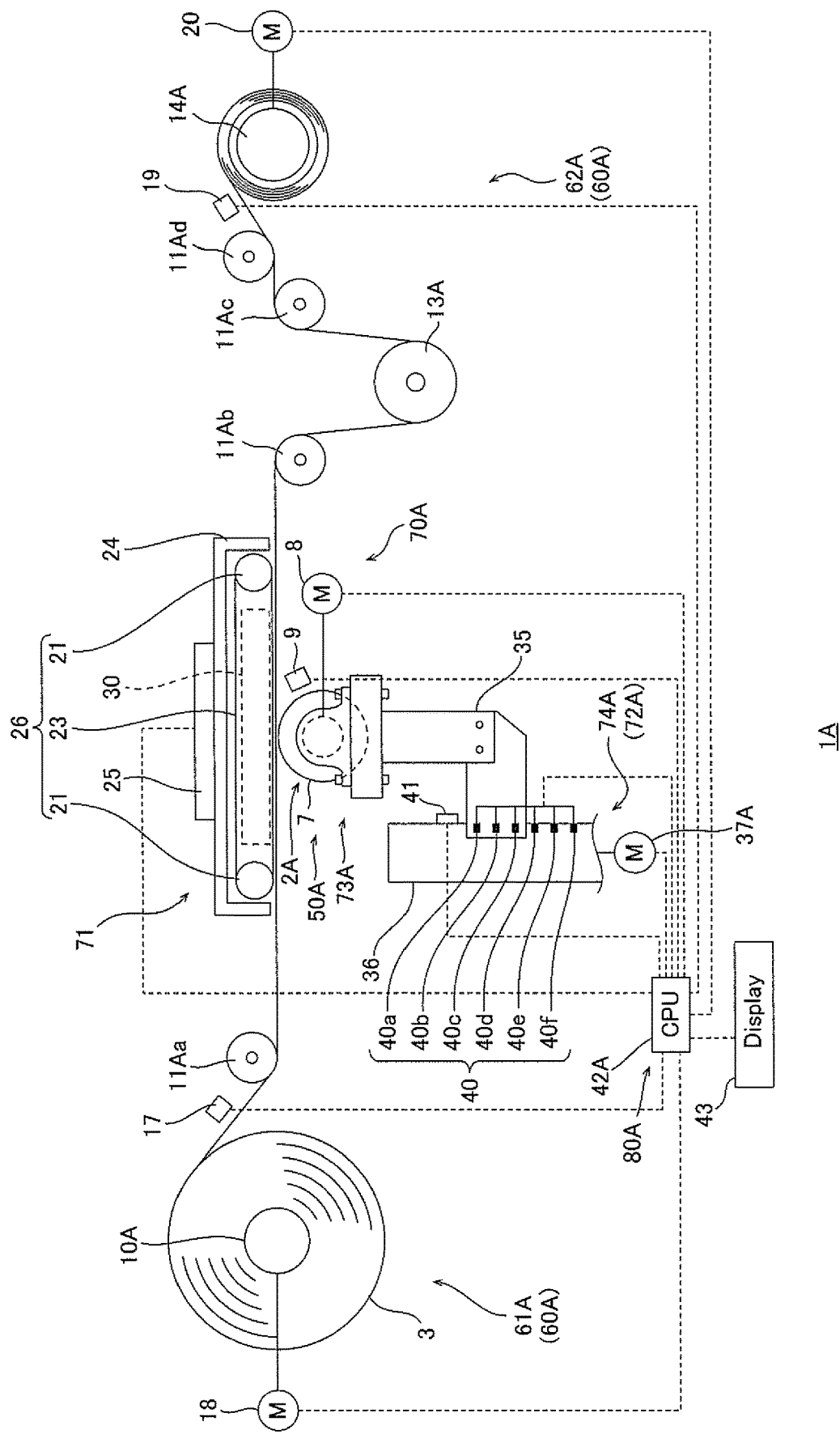
FIG. 1 is a schematic view showing a first embodiment of an application apparatus of the present invention.

In FIG. 1, an application apparatus 1A is equipped to continuously apply a solid brazing material 2A having a roll shape to an aluminum plate material 3 that is a workpiece to which solid brazing material 2A is to be applied.

The aluminum plate material 3 is made from aluminum or aluminum alloy.

The aluminum plate material 3 is a long plate material having a length of several thousand meters and a width between 5 mm and 200 mm.

The aluminum plate material 3, as described in detail below, is supported by a conveyance unit 60A (described below) and is continuously conveyed in a predetermined direction.

Figure 2:
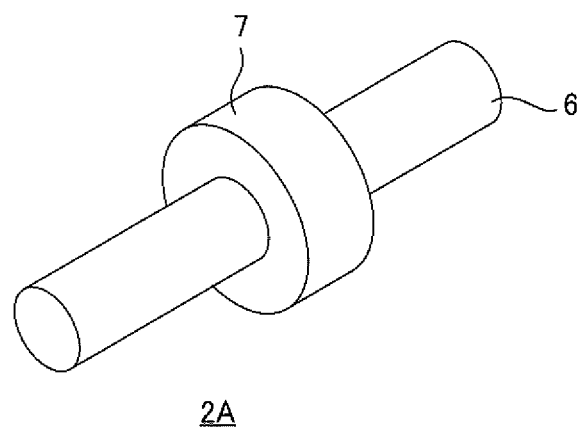
FIG. 2 is a schematic view showing a roll-shaped solid brazing material in the first embodiment.

The solid brazing material 2A having a roll shape (hereinafter, referred to as a roll-shaped brazing material 2A), as illustrated in FIG. 2, a rotating shaft 6 working as an attachment member and a solid brazing material 7 disposed around a rotating shaft 6.

The rotating shaft 6 has a column shape.

The solid brazing material 7 is a solid brazing material for brazing aluminum or aluminum alloy. Specifically, the solid brazing material 7 includes, for example, a fluoride flux and wax.

Examples of the fluoride flux include Cs—Al—F flux, K—Al—F flux, and K—Zn—F flux.

The wax is a component for improving the shape retentiveness of the solid brazing material 7. Examples of the wax include synthetic wax and natural wax.

Alternatively, as necessary, the solid brazing material 7 include an organic viscosity reducing agent and/or a film leveling auxiliary agent.

Examples of the organic viscosity reducing agent include surfactants such as nonionic surfactants and ionic surfactants, and organic solvents such as hydrocarbons, halogenated hydrocarbons, alcohols, esters, ethers, and fats.

The film leveling auxiliary agent is a component for improving the evenness (homogeneity) of the film by making the solid brazing material 7 brittle.

Examples of the film leveling auxiliary agent include high carbon carboxylic acids-low carbon alcohol esters including monocarbonic acids having a carbon number of 10 or more such as caprilic acid, lauric acid, myristic acid, palmitinic acid, and stearic acid, dicarboxylic acids a carbon number of 10 or more such as decanedioic acid, and dodecanedioic acid, and anhydrides thereof, high carbon alcohol esters-low carbon carboxylic acids including hydrogenated stearyl phthalate, hydrogenated lauryl phthalate, and stearyl methacrylate, and high carbon acetals including acetals having a carbon number of 10 to 30 such as stearyl aldehyde acrylate methyl ethyl diethyl ether=acetal and stearyl aldehyde acrylate methyl ethyl diethyl methacrylate=acetal.

The solid brazing material 7 is produced by mixing the above-described components (the fluoride flux, the wax, the organic viscosity reducing agent blended as necessary, and the film leveling auxiliary agent blended as necessary), and pouring and cooling the mixture in the hollow roll-shaped mold. The solid brazing material 7 produced in this manner keeps a desired shape by the wax. Preferably, the solid brazing material 7 is solid at room temperature (25° C.).

The solid brazing material 7 is in a wax-like state (a crayon-like state).

The solid brazing material 7 is not especially limited. For example, the formulation of the solid brazing material described in International Patent Application Publication No. 2018/235906 is poured and cooled in a hollow roll-shaped mold, thereby producing the solid brazing material.

The rotating shaft 6 is set in the central part of the roll-shaped mold and the above-described components are poured and cooled in the mold, thereby producing a roll-shaped brazing material 2A.

Hereinafter, the application apparatus 1A for applying the roll-shaped brazing material 2A to the aluminum plate material 3 will be described in detail.

The application apparatus 1A includes a conveyance unit 60A as a conveyance unit, an application unit 70A, and a controller 80A as a control unit.

The conveyance unit 60A includes a transmitting unit 61A and a rolling-up unit 62A.

The transmitting unit 61A and the rolling-up unit 62A are disposed with a predetermined space therebetween in a horizontal direction while the application unit 70A is placed therebetween.

The transmitting unit 61A is disposed, relative to the application unit 70A, on the upstream side in the conveyance direction.

The transmitting unit 61A includes a transmitting roller 10A and a first guide roller 11Aa in order from the upstream side to the downstream side in the conveyance direction. Further, the transmitting unit 61A includes a transmitting motor 18 and a first circumferential velocity sensor 17.

The transmitting roller 10A is a roller that holds and transmits the aluminum plate material 3 and is disposed at the uppermost part of the stream in the conveyance direction in which the aluminum plate material 3 is conveyed. The long aluminum plate material 3 is wrapped around the transmitting roller 10A. The rotation of the transmitting roller 10A allows for transmission of the aluminum plate material 3 from the upstream side to the downstream side in the conveyance direction.

The transmitting motor 18 is connected to the transmitting roller 10A.

The transmitting motor 18 is a known motor. The drive of the transmitting motor 18 rotates the transmitting roller 10A to transmit the aluminum plate material 3.

The first circumferential velocity sensor 17 is disposed above the aluminum plate material 3 transmitted from the transmitting roller 10A.

The first circumferential velocity sensor 17 is a laser doppler velocimeter and delivers laser light to the aluminum plate material 3 transmitted from the transmitting roller 10A and can detect the reflected light from the aluminum plate material 3 and can detect the circumferential velocity of the transmitting roller 10A from the difference of frequency between the irradiation light and the reflected light.

The first guide roller 11Aa is disposed on the downstream side of the transmitting roller 10A in the conveyance direction (the downstream side of the first circumferential velocity sensor 17 in the conveyance direction)

The first guide roller 11Aa guides the aluminum plate material 3 transmitted from the transmitting roller 10A to the application unit 70A.

The rolling-up unit 62A is disposed, relative to the application unit 70, on the downstream side in the conveyance direction.

The rolling-up unit 62A includes a second guide roller 11Ab, a tension roller 13A, a third guide roller 11Ac, a fourth guide roller 11Ad, and a rolling-up roller 14A in order from the upstream side to the downstream side in the conveyance direction. Further, the rolling-up unit 62A includes a rolling-up motor 20 and a second circumferential velocity sensor 19.

The second guide roller 11Ab and the third guide roller 11Ac are disposed with a predetermined space therebetween in the conveyance direction while the tension roller 13A is placed therebetween.

The tension roller 13A is disposed between the second guide roller 11Ab and the third guide roller 11Ac and can move in an up-down direction.

The tension roller 13A can adjust the tensile force of the aluminum plate material 3 being transmitted by moving between the second guide roller 11Ab and the third guide roller 11Ac in the up-down direction.

The fourth guide roller 11Ad is disposed on the downstream side of the third guide roller 11Ac in the conveyance direction.

The fourth guide roller 11Ad guides the aluminum plate material 3 being transmitted from the third guide roller 11Ac to the rolling-up roller 14A.

The rolling-up roller 14A is a roller for rolling up the transmitted aluminum plate material 3 and is disposed at the lowermost part of the stream in the conveyance direction of the aluminum plate material 3.

The rolling-up motor 20 is connected to the rolling-up roller 14A.

The rolling-up motor 20 is a known motor. The drive of the rolling-up motor 20 rotates the rolling-up roller 14A to roll up the aluminum plate material 3.

Further, the second circumferential velocity sensor 19 is disposed above the aluminum plate material 3 between the fourth guide roller 11Ad and the rolling-up roller 14A.

The second circumferential velocity sensor 19 is a laser doppler velocimeter and delivers laser light to the aluminum plate material 3 guided from the fourth guide roller 11Ad and can detect the reflected light from the aluminum plate material 3 and can detect the circumferential velocity of the rolling-up roller 14A from the difference of frequency between the irradiation light and the reflected light.

The application unit 70A includes a pressing force receiving unit 71 and a pressing force giving unit 72A.

The pressing force receiving unit 71 and the pressing force giving unit 72A is disposed with a predetermined space therebetween in the up-down direction while the aluminum plate material 3 transmitted by the conveyance unit 60A is placed therebetween.

The pressing force receiving unit 71 is disposed above the aluminum plate material 3, facing the pressing force giving unit 72A in the up-down direction.

The pressing force receiving unit 71 includes a casing 24, an endless belt mechanism 26, and a load cell 25 as a pressing force detecting unit.

The casing 24 is disposed so that its central part faces the roll-shaped brazing material 2A in the up-down direction.

The casing 24 is formed into an approximate box shape of which lower side is open.

The endless belt mechanism 26 is contained in and supported by the casing 24.

The endless belt mechanism 26 includes a pair of endless belt rollers 21 and an endless belt 23 wrapped around the pair of endless belt rollers 21.

The pair of endless belt rollers 21 with a space therebetween is disposed in the conveyance direction in the casing 24 and is supported by the casing 24.

The endless belt 23 is an endless belt and wrapped around the pair of endless belt rollers 21.

The pair of endless belt rollers 21 rotates and moves the endless belt 23 around it.

The load cell 25 is disposed on an upper surface of the casing 24.

The load cell 25 is a known pressure sensor and detects a pressing force described below.

The pressing force giving unit 72A includes a rotating unit 50A, a supporting portion 73A, and a pressing portion 74A as a pressing unit.

Figure 3:
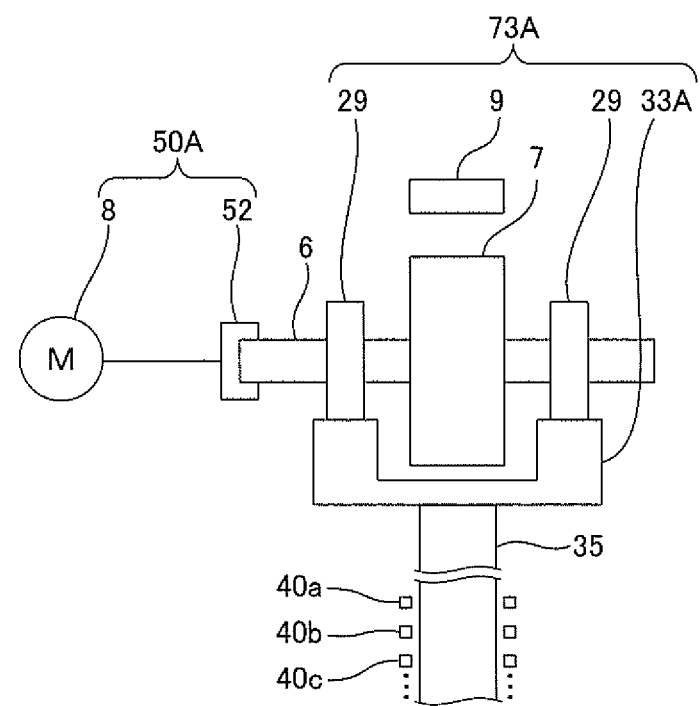
FIG. 3 is a schematic view showing the rotating unit in the first embodiment.

As illustrated in FIG. 3, the rotating unit 50A includes an application motor 8 as a power source, and a joint member 52 as a power transmission member for transmitting the power from the application motor 8 to the roll-shaped brazing material 2A.

The application motor 8 is a known motor. The drive of the application motor 8 rotates the roll-shaped brazing material 2A.

The joint member 52 is made of a known coupling. One end of the joint member 52 is connected to the application motor 8 while the other end is connected to the rotating shaft 6.

The supporting portion 73A includes a base 33A, a pair of bearing members 29 bearing the roll-shaped brazing material 2A, and a third circumferential velocity sensor 9 as a circumferential velocity detecting unit.

The base 33A has a U shape open upward. At both ends of the base 33A, the pair of bearing members 29 is supported.

The roll-shaped brazing material 2A is rotatably supported by the supporting portion 73A, in which the pair of bearing members 29 bears the rotating shaft 6, so that the solid brazing material 7 is located between the pair of bearing members 29.

The third circumferential velocity sensor 9 is provided on a side of the solid brazing material 7.

The third circumferential velocity sensor 9 is a laser doppler velocimeter and delivers laser light to the solid brazing material 7 and detects the reflected light from the solid brazing material 7 and can detect the circumferential velocity of the solid brazing material 7 from the difference of frequency between the irradiation light and the reflected light.

As illustrated in FIG. 1, the pressing portion 74A includes a support arm 35, a hoisting and lowering mechanism 36 supporting the support arm 35 so that the support arm 35 can move up and down, a hoisting and lowering motor 37A, an optical sensor unit 40 as a first thickness detecting unit, and a mechanical switch 41 as a second thickness detecting unit.

The support arm 35 has an L shape. An upper end of the support arm 35 is connected to the base 33A and a lower end of the support arm 35 is connected to the hoisting and lowering mechanism 36.

The hoisting and lowering mechanism 36 includes a cylinder and a piston (not illustrated) disposed in the cylinder and movable up and down. The support arm 35 is connected to the piston (not illustrated).

The hoisting and lowering motor 37A is connected to the piston (not illustrated) of the hoisting and lowering mechanism 36.

The hoisting and lowering motor 37A is a known motor. The drive of the hoisting and lowering motor 37A moves the piston (not illustrated) up and down and enables the support arm 35 to move up and down. In this manner, the supporting portion 73A can move up and down.

The optical sensor unit 40 is provided in the hoisting and lowering mechanism 36 (in the cylinder).

The optical sensor unit 40 includes a plurality of optical sensors 40a to 40f with regular spaces therebetween in the up-down direction.

Each of the optical sensors 40a to 40f includes a light receiving portion and a light emitting portion facing each other while the support arm 35 is placed therebetween (see FIG. 3).

Each of the optical sensors 40a to 40f is turned OFF when being shaded by the support arm 35.

Thus, in accordance with the number of the optical sensors 40a to 40f turned ON and OFF, the position of the support arm 35 of the hoisting and lowering mechanism 36 in the up-down direction.

As described below, a control unit 42A controls the pressure so that the solid brazing material 7 is pressed to the aluminum plate material 3 at a constant pressure. Thus, when the position of the support arm 35 is relatively low in the up-down direction, the solid brazing material 7 is thick. On the other hand, when the position of the support arm 35 is relatively high in the up-down direction, the solid brazing material 7 is thin. Thus, the number of the optical sensors 40a to 40f turned ON and OFF detects the thickness of the solid brazing material 7.

The mechanical switch 41 is provided in the hoisting and lowering mechanism 36 (in the cylinder) and disposed at a height corresponding to the height of the support arm 35 when the solid brazing material 7 is finished out in the up-down direction of the hoisting and lowering mechanism 36.

The mechanical switch 41 is a known pressure switch and is turned ON by the contact of the mechanical switch 41 with the support arm 35.

The controller 80A includes the control unit 42A and a display 43.

The control unit 42A includes a microcomputer.

The control unit 42A is electrically connected to the first circumferential velocity sensor 17, the second circumferential velocity sensor 19, the third circumferential velocity sensor 9, the load cell 25, the hoisting and lowering motor 37A, the application motor 8, the transmitting motor 18, the rolling-up motor 20, the optical sensor unit 40, and the mechanical switch 41.

The control unit 42A controls the drive of the transmitting motor 18 based on the circumferential velocity of the transmitting roller 10A detected by the first circumferential velocity sensor 17 to keep the conveyance velocity of the aluminum plate material 3 at a constant velocity.

While the amount of the aluminum plate material 3 wrapped around the transmitting roller 10A decreases, the circumferential velocity of the transmitting roller 10A decreases. To keep the circumferential velocity of the transmitting roller 10A constant, the control unit 42A controls the drive of the transmitting motor 18.

The control unit 42A controls the drive of the rolling-up motor 20 based on the circumferential velocity of the rolling-up roller 14A detected by the second circumferential velocity sensor 19 to keep the conveyance velocity of the aluminum plate material 3 at a constant velocity.

While the amount of the aluminum plate material 3 wrapped around the rolling-up motor 20 increases, the circumferential velocity of the rolling-up motor 20 increases. To keep the circumferential velocity of the rolling-up roller 14A constant, the control unit 42A controls the drive of the rolling-up motor 20.

The control unit 42A controls the drive of the application motor 8 based on the circumferential velocity of the roll-shaped brazing material 2A detected by the third circumferential velocity sensor 9 to keep the conveyance velocity of the roll-shaped brazing material 2A at a constant velocity.

Based on the pressing force detected by the load cell 25, the control unit 42A controls the pressing force by driving the hoisting and lowering motor 37A so that the roll-shaped brazing material 2A is pressed to the aluminum plate material 3 at a constant pressing force.

Corresponding to the level of the height of the support arm 35 detected by the optical sensor unit 40 (corresponding to the thickness of the solid brazing material 7), the control unit 42A drives the application motor 8 to control the circumferential velocity of the roll-shaped brazing material 2A.

When the mechanical switch 41 is turned ON, the control unit 42A notifies the display 43 that the solid brazing material 7 is finished out, and/or stops the drives of the application motor 8 and/or the transmitting motor 18 (and the rolling-up motor 20), and stops the rotation of the roll-shaped brazing material 2A and/or the conveyance of the aluminum plate material 3.

The display 43 is electrically connected to the control unit 42A.

In accordance with the notification from the control unit 42A, the display 43 issues an alert warning that the solid brazing material 7 is finished out.

As necessary, the display 43 displays the circumferential velocity detected by each of the circumferential velocity sensors and the pressing force detected by the load cell 25 in real time. Further, the display 43 displays the diameter of the solid brazing material 7 calculated based on the circumferential velocity of the solid brazing material 7 and the number of revolutions of the application motor 8, and/or the thickness of the solid brazing material 7 detected by the optical sensor unit 40.

Hereinafter, the method of applying the solid brazing material using the above-described application apparatus 1A will be described more specifically in detail.

In the application method, while the solid brazing material 7 is rotated, the solid brazing material 7 is brought into contact with the aluminum plate material 3, thereby applying the solid brazing material 7 to the aluminum plate material 3.

Specifically, first, the long aluminum plate material 3 is wrapped around the transmitting roller 10A and the aluminum plate material 3 is bridged between the transmitting roller 10A and the rolling-up roller 14A.

Meanwhile, the roll-shaped brazing material 2A is set in the rotating unit 50A.

Next, the roll-shaped brazing material 2A is born by the pair of bearing members 29 in the supporting portion 73A.

Next, the drives of the transmitting motor 18 and rolling-up motor 20 are controlled, thereby transmitting the aluminum plate material 3.

At that time, the first circumferential velocity sensor 17 and the second circumferential velocity sensor 19 detect the circumferential velocity of the transmitting roller 10A (the aluminum plate material 3 being transmitted) and the circumferential velocity of the rolling-up roller 14A (the aluminum plate material 3 being rolled up), respectively. And the velocities are input as electrical signals into the control unit 42A.

Then, the control unit 42A controls the transmitting motor 18 and the rolling-up motor 20 based on the detection by the first circumferential velocity sensor 17 and the second circumferential velocity sensor 19 as described above to convey the aluminum plate material 3 at a constant conveyance velocity, for example, 10 m/minute or more, preferably 30 m/minute or more and, for example, 200 m/minute or less, preferably 150 m/minute or less.

Thereafter, the transmitted aluminum plate material 3 is rolled up on the rolling-up roller 14A.

Meanwhile, the drive of the application motor 8 is controlled, thereby rotating the solid brazing material 7.

Specifically, the solid brazing material 7 rotates so that the rotation direction in which the solid brazing material 7 rotates and the conveyance direction in which the aluminum plate material 3 is conveyed are the same at the contact part at which the solid brazing material 7 is in contact with the aluminum plate material 3.

Further, at that time, the circumferential velocity of the solid brazing material 7 is detected by the third circumferential velocity sensor 9 detects and is input as an electrical signal into the control unit 42A.

Meanwhile, the control unit 42A controls the application motor 8 based on the detection by the third circumferential velocity sensor 9 and rotates the roll-shaped brazing material 2A so that the circumferential velocity of the roll-shaped brazing material 2A (the solid brazing material 7) is at a predetermined velocity ratio (the circumferential velocity of the solid brazing material 7/the conveyance velocity of the aluminum plate material 3).

Preferably, the velocity ratio is adjusted to less than 1 or more than 1 (not to be 1). In other words, the control is carried out so that the circumferential velocity of the solid brazing material 7 is not the same as the conveyance velocity of the aluminum plate material 3.

More preferably, the control is carried out so that the velocity ratio satisfies the following expression (1).

$$\text{the velocity ratio} = (\text{the amount of application}/A) + 1 \quad (1)$$

(In the expression, A satisfies $0 < A \leq 70$. The unit of A and the amount of application is $g/m^2$.)

Specifically, the velocity ratio is, for example, more than 1.0 and, for surely increasing the amount of application, preferably 1.03 or more, more preferably 1.1 or more, even more preferably 2.0 or more and, for example, 101 or less, preferably 61 or less, more preferably 21 or less.

Then, the control unit 42A controls the application motor 8 based on the detection by the third circumferential velocity sensor 9, thereby keeping the rate of change of the set velocity ratio, for example, at 30% or less.

Further, the drive of the hoisting and lowering motor 37A pushes up the support arm 35 to bring the solid brazing material 7 into contact with the aluminum plate material 3.

In this manner, the solid brazing material 7 is ground and the ground solid brazing material 7 is adhered (applied) to the aluminum plate material 3.

Furthermore, at that time, the pressing force that the aluminum plate material 3 (and the pressing force receiving unit 71) receives from the solid brazing material 7 is detected by the load cell 25 and is input as an electrical signal into the control unit 42A.

Then, the control unit 42A controls the operation of the hoisting and lowering motor 37A to keep the pressing force of the support arm 35 at a constant value.

Specifically, the rate of change of the pressing force is, for example, 30% or less.

The rate of change of the pressing force is defined as the ratio of the difference between the set value of the pressing force and the measured value detected by the load cell 25, relative to the set value.

In this manner, the solid brazing material 7 is continuously applied to the aluminum plate material 3 at a constant thickness.

While the application of the solid brazing material 7 to the aluminum plate material 3 continues, the volume of the solid brazing material 7 decreases (in other words, the thickness of the solid brazing material 7 decreases).

In such a case, the load cell 25 detects the decrease in pressing force and inputs the decrease as an electrical signal into the control unit 42A.

Then, the control unit 42A controls the operation of the hoisting and lowering motor 37A to push the support arm 35 upward. In this manner, the pressing force of the support arm 35 is kept at a constant value again.

When the support arm 35 is pushed upward, the optical sensor unit 40 detects the change of the position of the support arm 35 in the up-down direction and inputs the change as an electrical signal into the control unit 42A.

Then, the control unit 42A controls the operation of the application motor 8 to increase the number of revolutions of the roll-shaped brazing material 2A.

In this manner, the control unit 42A keeps the pressing force of the support arm 35 at a constant value, and increases the number of revolutions of the roll-shaped brazing material 2A depending on the decrease in the thickness of the solid brazing material 7 to keep the circumferential velocity of the roll-shaped brazing material 2A constant so that the above-described velocity ratio is adjusted in a predetermined range.

While the application of the solid brazing material 7 to the aluminum plate material 3 is further continued, the position of the support arm 35 in the up-down direction gets gradually high. Finally, the support arm 35 touches the mechanical switch 41. Then, the mechanical switch 41 is turned ON. The mechanical switch 41 inputs an electrical signal into the control unit 42A.

Then, the control unit 42A detects the signals from the mechanical switch 41 and notifies the display 43 that the solid brazing material 7 is finished out. Then, the display 43 displays the message of replacement of the solid brazing material 7. And/or the drive of the application motor 8 is stopped and the rotation of the roll-shaped brazing material 2A is stopped. And/or the drive of the transmitting motor 18 and the drive of the rolling-up motor 20 are stopped to stop the conveyance of the aluminum plate material 3. And/or, the drive of the application motor 8, the drive of the transmitting motor 18, and the drive of the rolling-up motor 20 are stopped to stop the rotation of the roll-shaped brazing material 2A and the conveyance of the aluminum plate material 3.

The amount of application is, for example, 2 $g/m^2$ or more, preferably 5 $g/m^2$ or more, more preferably 10 $g/m^2$ or more and, for example, 25 $g/m^2$ or less, preferably 20 $g/m^2$ or less.

Meanwhile, the amount of application equivalent to only the flux component (specifically, the fluoride flux) is, for example, 1 $g/m^2$ or more, preferably 3 $g/m^2$ or more and, for example, 15 $g/m^2$ or less, preferably 10 $g/m^2$ or less.

Then, in the application method, the solid brazing material 7 applied to the aluminum plate material 3 is dried on the way of the conveyance. Then, the application film of the solid brazing material 7 is formed on the aluminum plate material 3.

The thickness of the formed application film is, for example, 1 μm or more, preferably 3 μm or more an, for example, 25 μm or less, preferably 20 μm or less.

The aluminum plate material 3 including the above-described application film is suitably used for the production of aluminum or aluminum alloy products such as a heat exchanger.

(Operation and Effect)

In the application apparatus 1A, while the rotating unit 50A rotates the solid brazing material 7, the conveyance unit 60A conveys the long aluminum plate material 3. In other words, while being rotated, the solid brazing material 7 is brought into contact with the aluminum plate material 3.

Thus, in the application apparatus 1A, the rotation of the solid brazing material 7 increases the amount of the solid brazing material 7 being applied. Thus, even when the contact area of the solid brazing material 7 with the aluminum plate material 3 is small, the amount of application can be increased.

In the application apparatus 1A, the control unit 42A controls the rotating unit 50A to keep the velocity ratio in a predetermined range.

In the application apparatus 1A, the amount of application is surely increased when the rotation direction in which the solid brazing material 7 rotates and the conveyance direction in which the aluminum plate material 3 is conveyed are the same at the contact part at which the solid brazing material 7 is in contact with the aluminum plate material 3, and the velocity ratio of the circumferential velocity of the solid brazing material 7 to the conveyance velocity of the aluminum plate material 3 (the circumferential velocity of the solid brazing material 7/the conveyance velocity of the aluminum plate material 3) is less than 1 or more than 1.

In other words, in the application apparatus 1A, the amount of application is surely increased when the rotation direction of the solid brazing material 7 and the conveyance direction of the aluminum plate material 3 are the same at the contact part of the solid brazing material 7 with the aluminum plate material 3 and the above-described velocity ratio is not 1.

Further, when the velocity ratio (the circumferential velocity of the solid brazing material 7/the conveyance velocity of the aluminum plate material 3) satisfies the above-described expression (1), the amount of application is surely increased.

Furthermore, in the application apparatus 1A, when the rate of change of the velocity ratio is, for example, 30% or less, preferably 20% or less, more preferably 10% or less, a stable amount of application is maintained.

In the application apparatus 1A, the control unit 42A controls the circumferential velocity of the solid brazing material 7 based on the circumferential velocity of the solid brazing material 7 detected by the third circumferential velocity sensor 9 to adjust the above-described velocity ratio.

Thus, by the application apparatus 1A, a predetermined amount of the solid brazing material can surely be applied to the workpiece.

In the application apparatus 1A, while the solid brazing material 7 is applied to the aluminum plate material 3, the diameter of the solid brazing material 7 becomes small.

When the diameter decreases, the amount of application of the solid brazing material 7 for one revolution decreases. In other words, when the number of revolutions of the solid brazing material 7 is constant, the amount of application changes in response to the decrease in the solid brazing material 7.

Meanwhile, in the application apparatus 1A, the control unit 42A adjusts the circumferential velocity of the solid brazing material to keep the circumferential velocity constant without decreasing (in other words, the number of revolutions is increased) based on the thickness of the solid brazing material 7 detected by the optical sensor unit 40. In this manner, even when the diameter of the solid brazing material 7 gradually decreases, the increase in the number of revolutions of the solid brazing material 7 keeps the amount of application constant. As a result, a stable amount of application is maintained.

In the application apparatus 1A, based on the detection of the mechanical switch 41, the control unit 42A notifies that the solid brazing material 7 is finished out and/or stops the rotation of the solid brazing material 7 and/or the conveyance of the aluminum plate material 3.

Thus, in the application apparatus 1A, the solid brazing material 7 can be replaced at an optimal timing before the solid brazing material 7 is finished.

In the application apparatus 1A, the control unit 42A controls the pressing force based on the pressing force detected by the load cell 25 so that the solid brazing material 7 can be pressed to the aluminum plate material 3 at a constant pressing force.

Thus, in the application apparatus 1A, when the application reduces the thickness of the solid brazing material 7, the solid brazing material 7 is in contact with the aluminum plate material 3 at a constant pressure. As a result, the solid brazing material 7 is stably applied to the aluminum plate material 3.

Further, in the application apparatus 1A, when the rate of change of the pressing force is, for example, 30% or less, preferably 20% or less, more preferably, 10% or less, a stable amount of application is maintained.

In this manner, the method of producing the aluminum plate material 3 to which the solid brazing material 7 is applied includes the application method described above. Thus, the aluminum plate material 3 to which the solid brazing material 7 is applied at a constant amount of application is produced.

Furthermore, the roll-shaped brazing material 2A has a roll shape and thus can suitably be used in the application method.

In other words, the roll-shaped brazing material 2A has a roll shape to set in the rotating unit 50A and thus can suitably be used in the above-described application apparatus 1A.

Further, the roll-shaped brazing material 2A includes the rotating shaft 6. Thus, even when the application reduces the thickness of the solid brazing material 7, the solid brazing material 7 can be used to its edge adjacent to the rotating shaft 6. As a result, the yield is improved.

2. Second Embodiment

In the second embodiment described below with reference to FIG. 4, FIG. 5, FIG. 6A, and FIG. 6B, the same members and steps as those in the first embodiment will be given the same numerical references and the detailed description thereon will be omitted.

Figure 4:
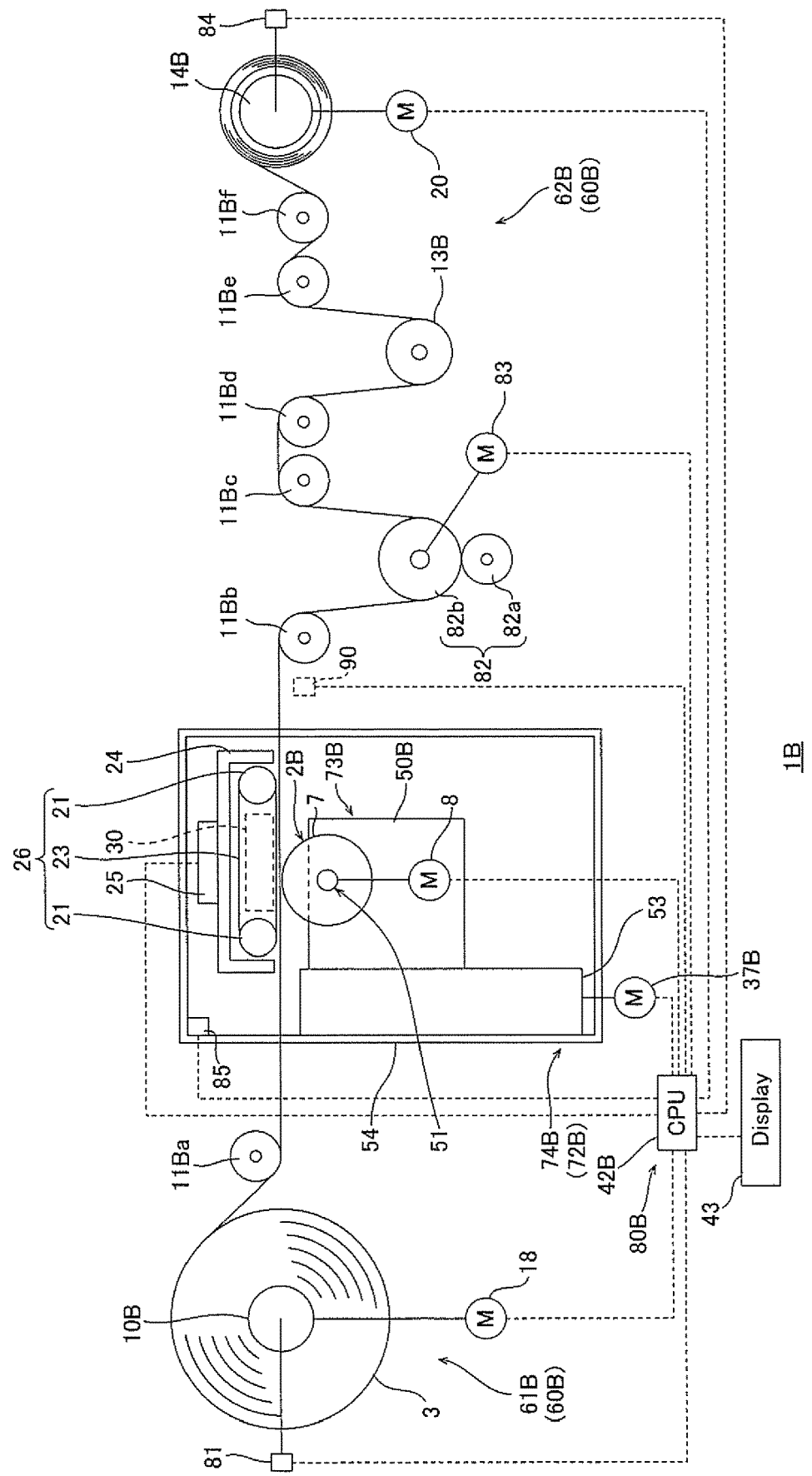
FIG. 4 is a schematic view showing a second embodiment of the application apparatus of the present invention.

In FIG. 4, an application apparatus 1B is equipped to apply a roll-shaped brazing material 2B to an aluminum plate material 3 as a workpiece.

Figure 5:
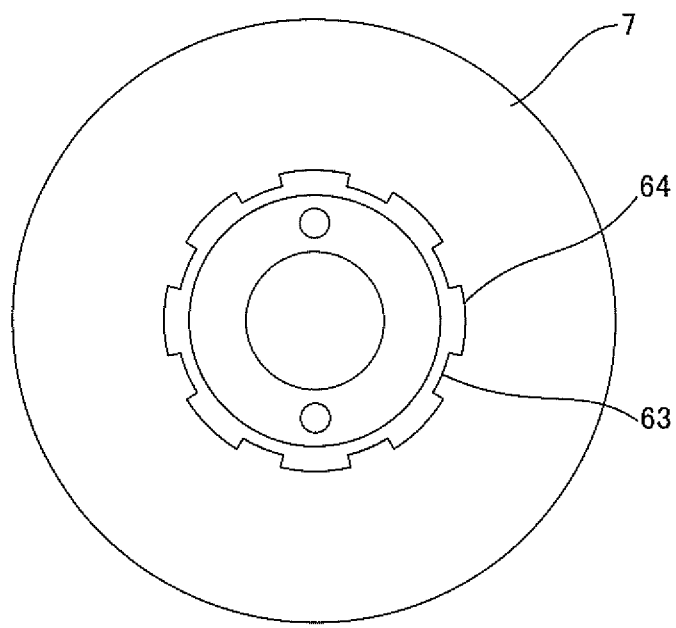
FIG. 5 is a flow diagram showing a roll-shaped solid brazing material in the second embodiment.

The roll-shaped brazing material 2B includes, as illustrated in FIG. 5, a connection portion 63 as an attachment member and a solid brazing material 7 disposed around the connection portion 63.

The connection portion 63 has a tubular shape. A plurality of protrusions 64 protruding outward in a radial direction is disposed with spaces therebetween on an outer circumferential surface of the connection portion 63 in the axial direction and a circumferential direction.

Figure 6B:
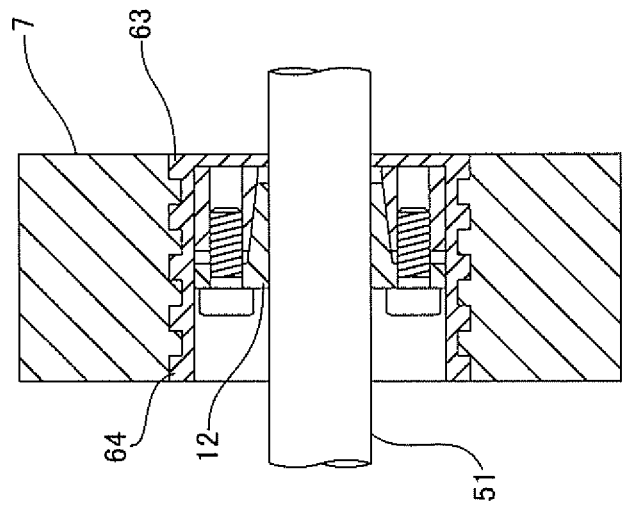
FIGS. 6A and 6B are flow diagrams showing a rotating unit in the second embodiment.
Figure 6A:
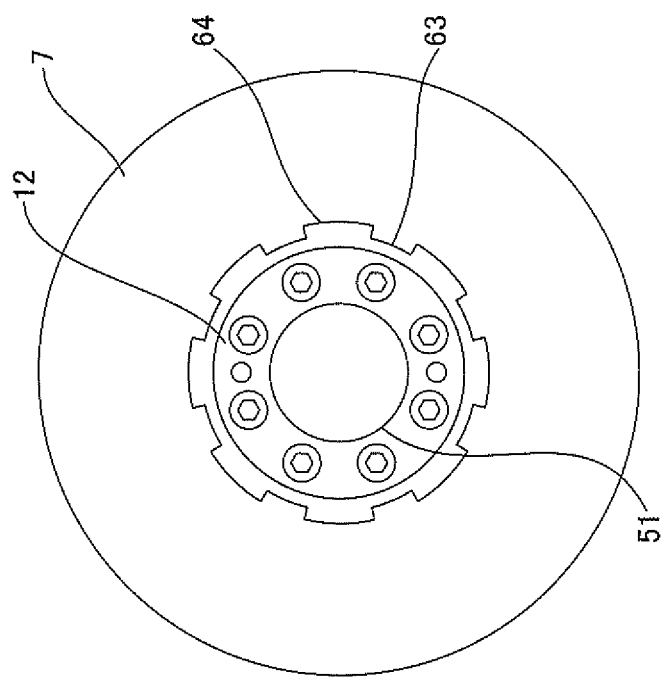

In other words, as illustrated in FIG. 6A, the plurality of protrusions 64 is disposed with spaces therebetween on a whole circle of the outer circumferential surface of the connection portion 63 in the circumferential direction.

Further, as illustrated in FIG. 6B, the protrusions 64 are disposed with spaces therebetween in the axial direction of the connection portion 63.

The protrusions 64 increase the contact area of the connection portion 63 and the solid brazing material 7 and exert an anchoring force between the protrusions 64 and the solid brazing material 7, and thus the solid brazing material 7 is firmly fixed on the connection portion 63.

Then, while the connection portion 63 is set in the central part of a roll-shaped mold, the above-described components of the solid brazing material 7 are poured and cooled in the mold. In this manner, the roll-shaped brazing material 2B is produced.

Hereinafter, the application apparatus 1B for applying the roll-shaped brazing material 2B to the aluminum plate material 3 will be described in detail.

The application apparatus 1B includes a conveyance unit 60B as a conveyance unit an application unit 70B and a controller 80B as a control unit.

The conveyance unit 60B includes a transmitting unit 61B and a rolling-up unit 62B.

The transmitting unit 61B and the rolling-up unit 62B are disposed horizontally with a predetermined space while the application unit 70B is placed therebetween.

The transmitting unit 61B is disposed on the upstream side in the conveyance direction, relative to the application unit 70B.

The transmitting unit 61B includes a transmitting roller 10B and a first guide roller 11Ba in order from the upstream side to the downstream side in the conveyance direction. Further, the transmitting unit 61B includes a transmitting motor 18 and a first torque meter 81.

The transmitting roller 10B is a roller that holds and transmits the aluminum plate material 3 and is disposed at the uppermost part of the stream in the conveyance direction in which the aluminum plate material 3 is conveyed. The long aluminum plate material 3 is wrapped around the transmitting roller 10B. The rotation of the transmitting roller 10B transmits the aluminum plate material 3 from the upstream side to the downstream side in the conveyance direction.

The transmitting motor 18 is connected to the transmitting roller 10B.

The transmitting motor 18 is a known motor. The drive of the transmitting motor 18 rotates the transmitting roller 10B to transmit the aluminum plate material 3.

Further, the first torque meter 81 is connected to the transmitting roller 10B.

The first torque meter 81 is a known torque meter and detects the torque to the rotating shaft of the transmitting roller 10B.

The first guide roller 11Ba is disposed on the downstream side of the transmitting roller 10B in the conveyance direction.

The first guide roller 11Ba guides the aluminum plate material 3 transmitted from the transmitting roller 10B to the application unit 70B.

The rolling-up unit 62B is disposed on the downstream side in the conveyance direction relative to the application unit 70B.

The rolling-up unit 62B includes a second guide roller 11Bb, a pair of conveyance rollers 82, a third guide roller 11Bc, a fourth guide roller 11Bd, a tension roller 13B, a fifth guide roller 11Be, a sixth guide roller 11Bf, and a rolling-up roller 14B in order from the upstream side to the downstream side in the conveyance direction. Further, the rolling-up unit 62B includes a conveyance motor 83, a second torque meter 84, and a rolling-up motor 20.

The second guide roller 11Bb and the third guide roller 11Bc are disposed with a predetermined space therebetween in the conveyance direction while the pair of conveyance rollers 82 is placed therebetween.

The pair of conveyance rollers 82 is a roller that conveys the aluminum plate material 3 and is disposed between the second guide roller 11Bb and the third guide roller 11Bc.

The pair of conveyance rollers 82 includes a lower conveyance roller 82a and an upper conveyance roller 82b facing an upper side of the lower conveyance roller 82a.

The lower conveyance roller 82a and the upper conveyance roller 82b holds the aluminum plate material 3 therebetween and rotate to convey the aluminum plate material 3 from the upstream side to the downstream side in the conveyance direction.

The conveyance motor 83 is connected to the upper conveyance roller 82b.

The conveyance motor 83 is a known motor. The drive of the conveyance motor 83 rotates the upper conveyance roller 82b. Following the rotation of the upper conveyance roller 82b, the lower conveyance roller 82a rotates. The rotations of the upper conveyance roller 82b and the lower conveyance roller 82a convey the aluminum plate material 3 from the upstream side to the downstream side in the conveyance direction.

The fourth guide roller 11Bd and the fifth guide roller 11Be are disposed on the downstream side of the third guide roller 11Bc in the conveyance direction, and are disposed with a predetermined space therebetween in the conveyance direction while the tension roller 13B is placed therebetween in the conveyance direction.

The tension roller 13B is disposed and movable in an up-down direction between the fourth guide roller 11Bd and the fifth guide roller 11Be.

By moving in the up-down direction between the fourth guide roller 11Bd and the fifth guide roller 11Be, the tension roller 13B can adjust the tensile force of the aluminum plate material 3 being conveyed.

A sixth guide roller 11Bf is disposed on the downstream side of the fifth guide roller 11Be in the conveyance direction.

The sixth guide roller 11Bf guides the aluminum plate material 3 transmitted from the fifth guide roller 11Be to the rolling-up roller 14B.

The rolling-up roller 14B is a roller for rolling up the transmitted aluminum plate material 3 and is disposed at the lowermost part of the stream in the conveyance direction of the aluminum plate material 3.

The rolling-up motor 20 is connected to the rolling-up roller 14B.

The rolling-up motor 20 is a known motor. The drive of the rolling-up motor 20 rotates the rolling-up roller 14 to roll up the aluminum plate material 3.

The second torque meter 84 is connected to the rolling-up roller 14B.

The second torque meter 84 is a known torque meter and can detect the torque to the rotating shaft of the rolling-up roller 14B.

The application unit 70B includes a pressing force receiving unit 71 and a pressing force giving unit 72B.

The pressing force receiving unit 71 and the pressing force giving unit 72B are disposed with a predetermined space therebetween in the up-down direction while the aluminum plate material 3 being conveyed by the conveyance unit 60 is placed therebetween.

The pressing force receiving unit 71 is disposed above the aluminum plate material 3 in a frame of a second supporting member 54 (described below) and faces the pressing force giving unit 72B in the up-down direction.

The pressing force receiving unit 71 includes the same members as those of the first embodiment described above.

The pressing force giving unit 72B includes a rotating unit 50B, a supporting portion 73B, and a pressing portion 74B as a pressing unit.

The rotating unit 50B includes, as illustrated in FIG. 4, an application motor 8 as a power source for rotating the roll-shaped brazing material 2B and a rotating shaft 51 as a power transmission member that transmits the power from the application motor 8 to the roll-shaped brazing material 2A.

The rotating shaft 51 has a cylindrical shape and is connected to the application motor 8 via, for example, a coupling not illustrated and one end of the rotating shaft 51 is rotatably supported by the supporting portion 73B.

Further, the roll-shaped brazing material 2B is set in the rotating unit 50B by a method described below.

The supporting portion 73B has a plate shape extending in the up-down direction. The supporting portion 73B supports the rotating shaft 51 and the application motor 8.

The pressing portion 74B includes a first supporting member 53 supporting the supporting portion 73B, the second supporting member 54 supporting the first supporting member 53, a hoisting and lowering motor 37B, and a distance sensor 85 as a first thickness detecting unit and a second thickness detecting unit.

The first supporting member 53 extends in the up-down direction and the supporting portion 73B is connected to a side surface of the first supporting member 53.

The second supporting member 54 has a frame shape extending in the up-down direction. The first supporting member 53 including a ball screw (not illustrated) is connected to one side surface in the frame so that the first supporting member 53 can move in the up-down direction.

The hoisting and lowering motor 37B is a known motor. The drive of the hoisting and lowering motor 37B enables the first supporting member 53 to move up and down. In this manner, the roll-shaped brazing material 2B can move up and down.

The distance sensor 85 is disposed above the first supporting member 53 with a space therebetween.

The distance sensor 85 is a known laser distance sensor that can detect the distance between the distance sensor 85 and the first supporting member 53 by delivering laser light to the first supporting member 53, detecting the reflected light from the first supporting member 53, and converting it into a distance. Although described in detail below, to keep the pressing force detected by the load cell 25 at a predetermined value, the control unit 42B moves the first supporting member 53 in the up-down direction, by a decreased volume of the solid brazing material 7 (or, by a decreased thickness of the solid brazing material 7). At the time, the rate of change of the position in the up-down direction corresponds to the above-described distance of the rate of change of the positon in the up-down direction. In other words, the control unit 42B can calculate the decrease in the thickness of the solid brazing material 7 (the decrease in the diameter of the solid brazing material 7) based on the above-described distance of the rate of change of the positon in the up-down direction that the distance sensor 85 detects. In this manner, the diameter of the solid brazing material 7 is found.

The controller 80B includes a control unit 42B and a display 43.

The control unit 42B includes a microcomputer.

The control unit 42B is electrically connected to the conveyance motor 83, the first torque meter 81, the second torque meter 84, the load cell 25, the hoisting and lowering motor 37B, the application motor 8, the transmitting motor 18, the rolling-up motor 20, and the distance sensor 85.

The control unit 42B controls the drive of the conveyance motor 83 to keep the conveyance velocity of the aluminum plate material 3 at a constant velocity.

The control unit 42B controls the drive of the transmitting motor 18 and rolling-up motor 20 based on the torque to the rotating shaft of the transmitting roller 10B and the torque to the rotating shaft of the rolling-up roller 14B detected by the first torque meter 81 and the second torque meter 84 so that the tensile force of the aluminum plate material 3 is constant.

The control unit 42B controls the pressing force based on the pressing force detected by the load cell 25 by driving the hoisting and lowering motor 37B so that the roll-shaped brazing material 2B is pressed to the aluminum plate material 3 at a constant pressing force.

The control unit 42B detects the distance between the distance sensor 85 and the first supporting member 53 detected by the distance sensor 85. Then, the control unit 42B calculates the circumferential velocity of the roll-shaped brazing material 2B based on the diameter of the solid brazing material 7 calculated from the distance and the number of revolutions of the application motor 8 and controls the drive of the application motor 8 to keep the circumferential velocity of the roll-shaped brazing material 2B at a constant velocity.

When the distance between the distance sensor 85 and the hoisting and lowering motor 37B becomes a predetermined value, the control unit 42B notifies the display 43 that the solid brazing material 7 is finished out and/or stops the drives of the application motor 8 and/or the conveyance motor 83 (and the transmitting motor 18 and the rolling-up motor 20) and stops the rotation of the roll-shaped brazing material 2B and/or the conveyance of the aluminum plate material 3.

The display 43 is electrically connected to the control unit 42B.

In accordance with the notification from the control unit 42B, the display 43 issues an alert warning that the solid brazing material 7 is finished out.

As necessary, the display 43 displays in real time the diameter of the solid brazing material 7 calculated based on the distance detected by the distance sensor 85, the circumferential velocity of the solid brazing material 7 calculated based on the diameter and the number of revolutions of the application motor 8, the pressing force detected by the load cell 25, the conveyance velocity controlled by the conveyance motor 83, and the tensile force of the aluminum plate material 3 detected by each of the torque meters.

Hereinafter, the application method of the solid brazing material using the application apparatus 1B will more specifically be described.

In the application method, while being rotated, the solid brazing material 7 is brought into contact with the aluminum plate material 3 being conveyed, thereby applying the solid brazing material 7 to the aluminum plate material 3.

Specifically, first, the long aluminum plate material 3 is wrapped around the transmitting roller 10B and the aluminum plate material 3 is bridged between the transmitting roller 10B and the rolling-up roller 14B.

Meanwhile, the roll-shaped brazing material 2B is set in the rotating unit 50B.

Specifically, as illustrated in FIGS. 6A and 6B, the connection portion 63 of the roll-shaped brazing material 2B is inserted into the rotating shaft 51.

Then, the roll-shaped brazing material 2B is fastened to the rotating shaft 51 with a known friction bushing (for example, a hub member 12 described below).

Specifically, the hub member 12 is inserted into the rotating shaft 51 and is set in a hollowed part of the connection portion 63.

Then, by a method described below, the rotating shaft 51 is fastened to the hub member 12, and the hub member 12 is fastened to the connection portion 63.

Next, the drive of the conveyance motor 83 is controlled so that the conveyance velocity is kept constant, and the aluminum plate material 3 is conveyed at a constant conveyance velocity.

The conveyance velocity is the same as the conveyance velocity of the first embodiment described above.

At that time, the torque to the rotating shaft of the transmitting roller 10B and the torque to the rotating shaft of the rolling-up roller 14B are detected by the first torque meter 81 and the second torque meter 84 and are input as electrical signals into the control unit 42B.

Then, based on the detection by the first torque meter 81 and the second torque meter 84, the control unit 42B controls the drives of the transmitting motor 18 and the rolling-up motor 20 so that the tensile force of the aluminum plate material 3 is constant.

Thereafter, the transmitted aluminum plate material 3 is rolled up on the rolling-up roller 14B.

Meanwhile, the drive of the application motor 8 is controlled, and the solid brazing material 7 is rotated.

Specifically, the solid brazing material 7 rotates so that the rotation direction in which the solid brazing material 7 rotates and the conveyance direction in which the aluminum plate material 3 is conveyed are the same at the contact part at which the solid brazing material 7 is in contact with the aluminum plate material 3 and the velocity ratio becomes a predetermined velocity ratio (the circumferential velocity of the solid brazing material 7/the conveyance velocity of the aluminum plate material 3).

The predetermined velocity ratio is the same as the velocity ratio of the first embodiment described above.

Then, the drive of the hoisting and lowering motor 37B moves the first supporting member 53 (the roll-shaped brazing material 2B) upward, to bring the solid brazing material 7 into contact with the aluminum plate material 3.

In this manner, the solid brazing material 7 is ground, and the ground solid brazing material is adhered (applied) to the aluminum plate material 3.

At the time, the pressing force that the aluminum plate material 3 (and the pressing force receiving unit 71) receives from the solid brazing material 7 is detected by the load cell 25 and input as an electrical signal into the control unit 42B.

Then, the control unit 42B controls the operation of the hoisting and lowering motor 37B based on the detection by the load cell 25 to keep the pressing force of the first supporting member 53 at a constant value.

Specifically, the rate of change of the pressing force is kept, for example, 30% or less.

In this manner, the solid brazing material 7 is continuously applied to the aluminum plate material 3 at a constant thickness.

While the application of the solid brazing material 7 to the aluminum plate material 3 continues, the volume of the solid brazing material 7 decreases (In other words, the thickness of the solid brazing material 7 decreases).

In such a case, the load cell 25 detects the decrease in the pressing force and input the decrease as an electrical signal into the control unit 42B.

Then, the control unit 42B controls the operation of the hoisting and lowering motor 37B to push the first supporting member 53 upward. In this manner, the pressing force of the first supporting member 53 is kept at a predetermined value again.

Meanwhile, when the first supporting member 53 is pushed upward, the distance sensor 85 detects the change of the position of the first supporting member 53 in the up-down direction, and inputs the change as an electrical signal into the control unit 42B.

Then, the control unit 42B controls the operation of the application motor 8 to increase the number of revolutions of the roll-shaped brazing material 2B.

As described above, while keeping the pressing force of the first supporting member 53 at a predetermined value, the control unit 42B increases the number of revolutions of the roll-shaped brazing material 2B in response to the decrease in the thickness of the solid brazing material 7 to keep the circumferential velocity of the roll-shaped brazing material 2B constant so that the above-described velocity ratio is adjusted in a predetermined range.

While the application of the solid brazing material 7 to the aluminum plate material 3 further continues, the position of the first supporting member 53 gradually becomes high in the up-down direction. When the position reaches a predetermined position, the distance sensor 85 inputs an electrical signal into the control unit 42B.

Then, the control unit 42B detects the signal from the distance sensor 85 and notifies the display 43 that the solid brazing material 7 is finished out. Then, the display 43 displays the message of replacement of the solid brazing material 7. And/or the control unit 42B stops the drive of the application motor 8 and the rotation of the roll-shaped brazing material 2A. And/or the control unit 42B stops the drive of the transmitting motor 18, the drive of the rolling-up motor 20, and the drive of the conveyance motor 83 and stops the conveyance of the aluminum plate material 3. And/or the control unit 42B stops the drive of the application motor 8, the drive of the transmitting motor 18, the drive of the rolling-up motor 20, and the drive of the conveyance motor 83 and stops the rotation of the roll-shaped brazing material 2B and the conveyance of the aluminum plate material 3.

The amount of application is the same as the amount of application of the first embodiment described above.

Then, in the application method, the solid brazing material 7 applied to the aluminum plate material 3 is dried on the way of the conveyance. Then, the application film of the solid brazing material 7 is formed on the aluminum plate material 3.

The thickness of the formed application film is the same as the thickness in the first embodiment described above.

The aluminum plate material 3 including the above-described application film is suitably used for the production of aluminum or aluminum alloy products such as a heat exchanger.

In the above-described application apparatus 1B and the application method, the solid brazing material 7 is applied to the aluminum plate material 3 in the same manner as the first embodiment described above. Thus, a drying facility for drying a solvent or the like is not required and the cost is reduced.

Further, similarly to the first embodiment described above, to more efficiently form the application film, a drier (not illustrated) may be provided.

(Operation and Effect)

The application apparatus 1B in the second embodiment has the same effects as those of the application apparatus 1A of the first embodiment.

Further, in the application apparatus 1B, the control unit 42B adjusts the circumferential velocity of the solid brazing material 7 to keep the circumferential velocity constant without decreasing (in other words, the number of revolutions is increased) based on the diameter (thickness) of the solid brazing material 7 and the number of revolutions of the application motor 8 that the distance sensor 85 detects. In this manner, even when the diameter of the solid brazing material 7 gradually decreases, the increase in the revolution of the solid brazing material 7 keeps the amount of application constant. As a result, a stable amount of application is maintained.

In the application apparatus 1B, based on the detection of the distance sensor 85, the control unit 42B notifies that the solid brazing material 7 is finished out and/or stops the rotation of the solid brazing material 7 and/or the conveyance of the aluminum plate material 3.

Thus, in the application apparatus 1B, the solid brazing material 7 can be replaced at an optimal timing before the solid brazing material 7 runs out.

In other words, in the application apparatus 1A, the optical sensor unit 40 and the mechanical switch 41 determines the thickness of the solid brazing material. However, in the application apparatus 1B, the single distance sensor 85 can detect the thickness of the solid brazing material 7.

Further, in the application apparatus 1B, the distance sensor 85 can calculate the circumferential velocity of the solid brazing material 7 based on the diameter of the solid brazing material 7 and the number of revolutions of the application motor 8. Thus, in the application apparatus 1B, the third circumferential velocity sensor 9 working as the circumferential velocity detecting unit in the first embodiment can be omitted.

Furthermore, in the application apparatus 1B, from the number of revolutions of the conveyance motor 83, the circumferential velocity of the upper conveyance roller 82b (namely, the conveyance velocity of the aluminum plate material 3) can be calculated. Thus, the first circumferential velocity sensor 17 and second circumferential velocity sensor 19 in the first embodiment can be omitted.

Variation

In the first embodiment, to keep the above-described velocity ratio constant while keeping the conveyance velocity of the aluminum plate material 3 constant, the application motor 8 is controlled and thus the circumferential velocity of the roll-shaped brazing material 2A is controlled. Alternatively, to keep the above-described velocity ratio constant while keeping the circumferential velocity of the solid brazing material 7 constant, the transmitting motor 18 and the rolling-up motor 20 can be controlled and thus the conveyance velocity of the aluminum plate material 3 is controlled. Further, to keep the above-described velocity ratio constant, the application motor 8 can be controlled and thus the circumferential velocity of the roll-shaped brazing material 2A is controlled and simultaneously the transmitting motor 18 and the rolling-up motor 20 can be controlled and thus the conveyance velocity of the aluminum plate material 3 is controlled.

Further, in the first embodiment, when the volume of the solid brazing material 7 decreases (In other words, the thickness of the solid brazing material 7 decreases), the circumferential velocity of the solid brazing material 7 is kept constant based on the thickness of the solid brazing material 7 detected by the optical sensor unit 40 to adjust the velocity ratio in a predetermined range. Alternatively, however, the circumferential velocity of the solid brazing material 7 is controlled based on the circumferential velocity of the solid brazing material 7 detected by the third circumferential velocity sensor 9 to adjust the velocity ratio in a predetermined range.

Furthermore, in the first embodiment, the drives of the transmitting motor 18 and the rolling-up motor 20 convey the aluminum plate material 3. Alternatively, however, without the transmitting motor 18, the drive of the rolling-up motor 20 can convey the aluminum plate material 3.

Furthermore, in the first embodiment, the application apparatus 1A includes the mechanical switch 41 as the second thickness detecting unit. However, the optical sensor unit 40 can be used as the second thickness detecting unit.

In such a case, from the number of ONs and OFFs of the optical sensor unit 40 (the optical sensors 40a to 40f), a predetermined thickness of the solid brazing material 7 is detected stepwise.

In this manner, the notification corresponding to a predetermined thickness of the solid brazing material 7 (specifically, the notification corresponding to the remaining amount of the solid brazing material 7 (for example, capacity 50%, 30%, or 20%)) is input as an electrical signal into the control unit 42A.

Then, the control unit 42A detects the signal from the optical sensor unit 40 and the display 43 displays the remaining amount of the solid brazing material 7.

Further, in the hoisting and lowering mechanism 36 of the first embodiment, in place of the cylinder and piston, for example, a rack and pinion gear system or a ball screw can be used.

Furthermore, in the first embodiment, the roll shape of the roll-shaped brazing material 2 includes both of a hollow shape having a cavity in its central part and a filled shape without a cavity in its central part.

Specifically, in the first embodiment, the roll-shaped brazing material 2 has a hollow roll shape including the rotating shaft 6 therein. However, a solid brazing material (not illustrated) having a filled roll shape without the rotating shaft 6 (hereinafter, referred to as a "filled roll-shaped brazing material") can be used.

When the filled roll-shaped brazing material (not illustrated) is used, the filled roll-shaped brazing material is held from both sides by a pair of spacers (not illustrated). The rotation of the spacers (not illustrated) rotates the solid roll-shaped brazing material.

Furthermore, in the first embodiment, the rotating shaft 6 has a cylindrical shape. However, the rotating shaft 6 can have a protrusion and/or a rough surface at a part at which the rotating shaft 6 is in contact with the solid brazing material 7. The protrusion and/or rough surface can more firmly fix the solid brazing material 7 to the rotating shaft 6. The protrusion can have various shapes, such as a cuboid shape, an arched shape, a trapezoidal shape, or a triangle shape, that can increase the contact area of the rotating shaft and the solid brazing material and/or increase the anchoring force between the protrusion and the solid brazing material 7 can be used.

Furthermore, in the first embodiment, when the solid brazing material 7 is solidified, the rotating shaft 6 is set, thereby producing the roll-shaped brazing material 2A in which the rotating shaft 6 is fit into the solid brazing material 7. However, a hollow solid brazing material 7 is produced first and then the rotating shaft 6 is inserted into the hollowed part, thereby producing the roll-shaped brazing material 2A.

Furthermore, in the first embodiment, the pressing portion 74A includes the optical sensor unit 40 as the first thickness detecting unit and the mechanical switch 41 as the second thickness detecting unit. However, the pressing portion 74A does not necessarily include them.

Similarly, in the second embodiment, the distance sensor 85 detects the thickness of the solid brazing material 7. However, the detection can be omitted. In such a case, the pressing portion 74B can include the optical sensor unit 40 of the first embodiment as the first thickness detecting unit and the mechanical switch 41 as the second thickness detecting unit, or can exclude the first thickness detecting unit and the second thickness detecting unit.

Furthermore, in the second embodiment, to keep the above-described velocity ratio constant while keeping the conveyance velocity of the aluminum plate material 3 constant, the control of the application motor 8 is controlled and thus the circumferential velocity of the roll-shaped brazing material 2B is controlled. Alternatively, however, to keep the above-described velocity ratio constant while keeping the circumferential velocity of the solid brazing material 7 constant, the conveyance motor 83 can be controlled and thus the conveyance velocity of the aluminum plate material 3 is controlled. Furthermore, to keep the above-described velocity ratio, the application motor 8 can be controlled and thus the circumferential velocity of the roll-shaped brazing material 2B is controlled and simultaneously the conveyance motor 83 can be controlled and thus the conveyance velocity of the aluminum plate material 3 is controlled.

Furthermore, in the second embodiment, the first torque meter 81 and the second torque meter 84 are externally attached to the transmitting roller 10B and the rolling-up roller 14B, respectively. However, the first torque meter 81 and the second torque meter 84 can be embedded in the transmitting roller 10B and the rolling-up roller 14B.

Furthermore, in the second embodiment, the connection portion 63 is used as the attachment member. However, without the connection portion 63, a friction bushing (the hub member 12) can be used as the attachment member.

Figure 7B:
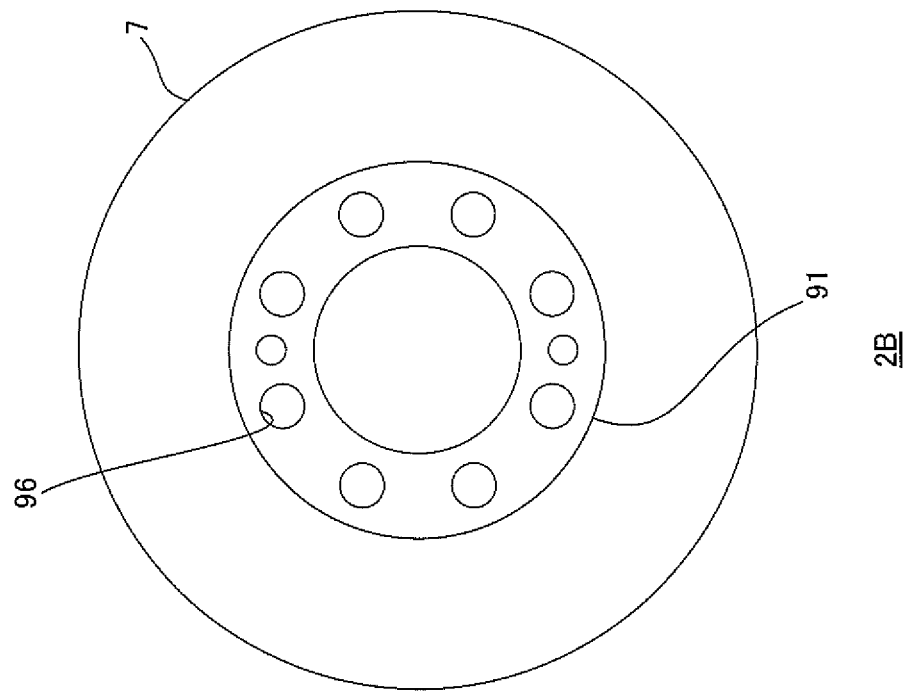
FIGS. 7A and 7B are schematic views showing the roll-shaped solid brazing material when the attachment member is a hub member.
Figure 7A:
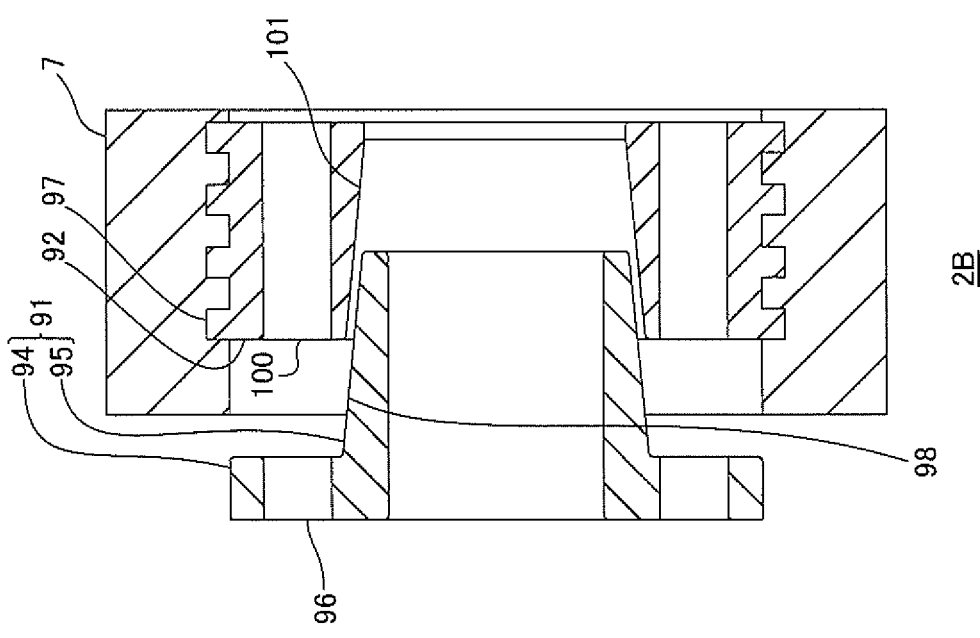

In such a case, the roll-shaped brazing material 2B, as illustrated in FIGS. 7A and 7B, includes the hub member 12 and the solid brazing material 7 disposed around the hub member 12.

The hub member 12 is a friction bushing including an inner ring 91 and an outer ring 92. In short, the hub member 12 has a friction bushing mechanism.

The inner ring 91 includes a tubular portion 95 having a cylindrical tubular shape and a flange 94 extending at an axial-direction one end of the tubular portion 95 in the radial direction.

A first tapering surface 98 having a diameter decreasing toward the other end is formed on an outer circumferential surface of the tubular portion 95.

The flange 94 has a ringed shape where a plurality of first bolt holes 96 penetrating in an axial direction is disposed with spaces therebetween in a circumferential direction.

The outer ring 92 has a thick cylindrical tubular shape where a plurality of second bolt holes 100 penetrating in an axial direction is disposed with spaces therebetween in a circumferential direction.

The second bolt holes 100 correspond to the first bolt holes 96.

A second tapering surface 101 that has a diameter decreasing toward the other end and faces the first tapering surface 98 is formed on an inner circumferential surface of the outer ring 92.

The inner diameter of one end of the outer ring 92 is larger than the outer diameter of the other end of the tubular portion 95. The inner diameter of the other end of the outer ring 92 is smaller than the outer diameter of the one end of the tubular portion 95.

A plurality of protrusions 97 is disposed with spaces therebetween on the outer circumferential surface of the outer ring 92 in the axial direction and the circumferential direction, protruding outward in the radial direction.

In other words, the plurality of protrusions 97 is disposed with spaces therebetween on the outer circumferential surface of the outer ring 92 entirely in the circumferential direction.

As illustrated in FIG. 7A, the protrusions 97 are disposed with spaces therebetween in the axial direction of the outer ring 92.

The protrusions 97 described above increase the contact area of the outer ring 92 and the solid brazing material 7 and exert the anchoring force between the protrusions 97 and the solid brazing material 7. Thus, the solid brazing material 7 can firmly be fixed to the outer ring 92.

Further, to produce the roll-shaped brazing material 2B, the outer ring 92 is first disposed in the hollowed part of the solid brazing material 7.

Next, the inner ring 91 is inserted from the tubular portion 95 into the outer ring 92.

In this manner, the roll-shaped brazing material 2B is produced.

Figure 8:
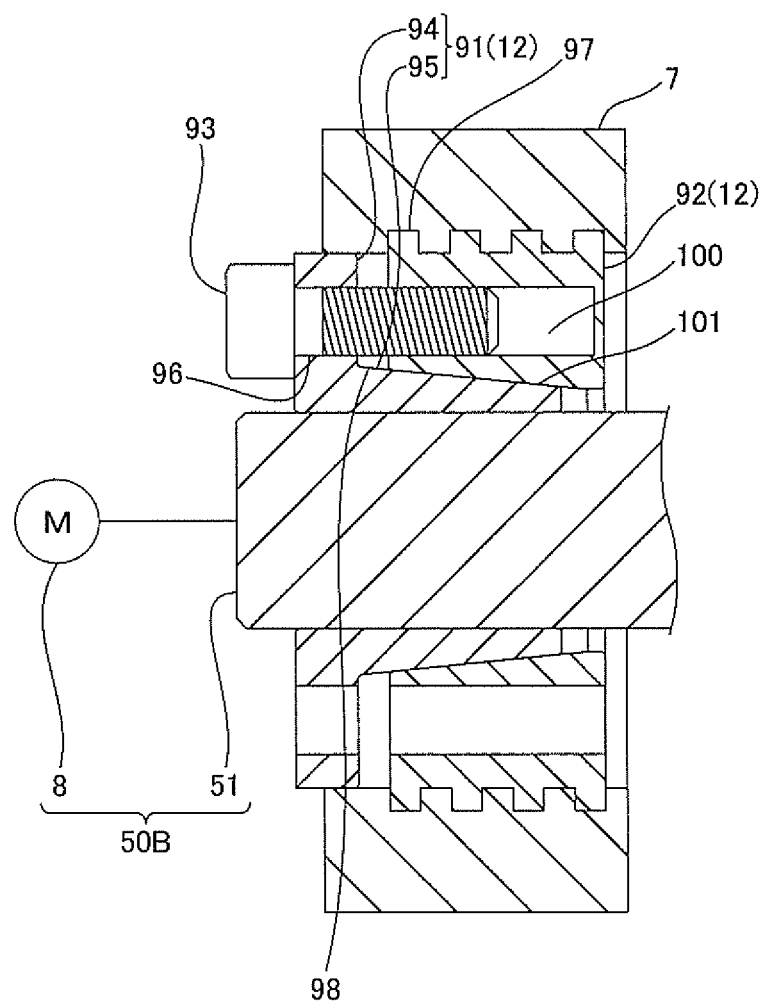
FIG. 8 is a schematic view showing the rotating unit when the attachment member is a hub member.

Further, to set the roll-shaped brazing material 2B in the rotating unit 50B, as illustrated in FIG. 8, the rotating shaft 51 is inserted into the tubular portion 95 of the hub member 12 in the roll-shaped brazing material 2B.

Next, a plurality of bolts 93 is inserted into the first bolt holes 96 and the second bolt holes 100 and tightened.

When the plurality of bolts 93 is tightened, the plurality of bolts 93 moves the inner ring 91 and the outer ring 92 relatively in the axial direction. Then, the first tapering surface 98 of the inner ring 91 and the second tapering surface 101 of the outer ring 92 are wedged.

Then, the diameter of the inner ring 91 deceases inward in the radial direction, and the rotating shaft 51 is fastened to the hub member 12. Meanwhile, the diameter of the outer ring 92 increases outward in the radial direction, and the hub member 12 is fastened to the solid brazing material 7.

In this manner, the rotating shaft 51 is firmly fastened to the solid brazing material 7.

In the above description, the shapes of the protrusions (the protrusions 64 and protrusions 97) are not especially limited. Various shapes, such as a cuboid shape, an arched shape, a trapezoidal shape, or a triangle shape, that can increase the contact area of the attachment member and the solid brazing material 7 and/or increase the anchoring force between the protrusions (the protrusions 64 and the protrusions 97) and the solid brazing material 7 can be used. Alternatively, instead of the protrusions (the protrusions 64 and the protrusions 97), a rough surface can be provided.

Further, in the above description, the outer surface of the rotating shaft 51 and the inner surface of the hub member 12 are smooth. However, to fit the outer surface of the rotating shaft 51 to the inner surface of the hub member 12 at a part to which the roll-shaped brazing material 2B of the rotating shaft 51 is fixed, the outer surface of the rotating shaft 51 and the inner surface of the hub member 12 can have a known shape, such as a set screw, a clamp, a key groove, or a gear, that can transmit power.

Further, in the above description, the tapering surface of the inner ring 91 is in contact with the tapering surface of the outer ring 92 and the plurality of bolts 93 fastens them. However, the surfaces are not limited to the tapering shapes. The surfaces can have a known shape such as, a set screw, a clamp, a key groove, or a gear, that can transmit power. In such a case, the inner ring 91 can be fastened to the outer ring 92 without the plurality of bolts 93.

Alternatively, the above-described outer ring 92 can be used as the attachment member.

In such a case, the roll-shaped brazing material 2B includes the outer ring 92 and the solid brazing material 7 disposed around the outer ring 92.

When the roll-shaped brazing material 2B is set in the rotating unit 50B, as described above, the inner ring 91 is inserted into the outer ring 92.

Alternatively, as the friction bushing, instead of a wedge friction bushing such as the hub member 12, a known hydraulic friction bushing can be used.

A commercially available product can be used as the friction bushing. For example, AS series (manufactured by Tsubakimoto Chain Co.) can be used as the wedge friction bushing.

Furthermore, in the second embodiment, the connection portion 63 is set when the solid brazing material 7 is solidified to produce the roll-shaped brazing material 2B in which the connection portion 63 is fit to the solid brazing material 7. However, to produce the roll-shaped brazing material 2B, a hollow solid brazing material 7 is produced and then the connection portion 63 is disposed in the hollowed part.

Furthermore, in the second embodiment, instead of the ball screw, for example, a rack and pinion gear system or a cylinder and a piston can be as the first supporting member 53.

In the first embodiment and the second embodiment, the rotating unit 50 includes a power source and a power transmission member. However, the power source and the power transmission member are not limited to the members above described. For example, a gear can be used as the power transmission member. Alternatively, the rotating unit 50 can include only a power source.

In the first embodiment, the conveyance unit 60A can include only the transmitting roller 10A and the rolling-up roller 14A in order from the upstream side to the downstream side in the conveyance direction. Or, in the second embodiment, the conveyance unit 60B can include only the transmitting roller 10B, the pair of conveyance rollers 82, and the rolling-up roller 14B in order from the upstream side to the downstream side in the conveyance direction.

Furthermore, in the first embodiment and the second embodiment, the rolling-up roller 14 rolls up the transmitted aluminum plate material 3. However, the rolling-up roller 14 can be excluded and the aluminum plate material 3 can be processed without being rolled up.

In such a case, in the first embodiment, the conveyance unit 60A includes the transmitting roller 10A and, as necessary, includes the other rollers (the first guide roller 11Aa, the second guide roller 11Ab, the tension roller 13A, the third guide roller 11Ac, and the fourth guide roller 11Ad).

Furthermore, in the second embodiment, the conveyance unit 60B includes the transmitting roller 10B and the pair of conveyance rollers 82 and, as necessary, includes the other rollers (the first guide roller 11Ba, the second guide roller 11Bb, the third guide roller 11Bc, the fourth guide roller 11Bd, the tension roller 13B, the fifth guide roller 11Be, and the sixth guide roller 11Bf).

Furthermore, in the first embodiment and the second embodiment, the single application unit 70 (the solid brazing material 7) is disposed. However, the number of the application units 70 (the solid brazing materials 7) is not limited and can be plural.

Figure 9:
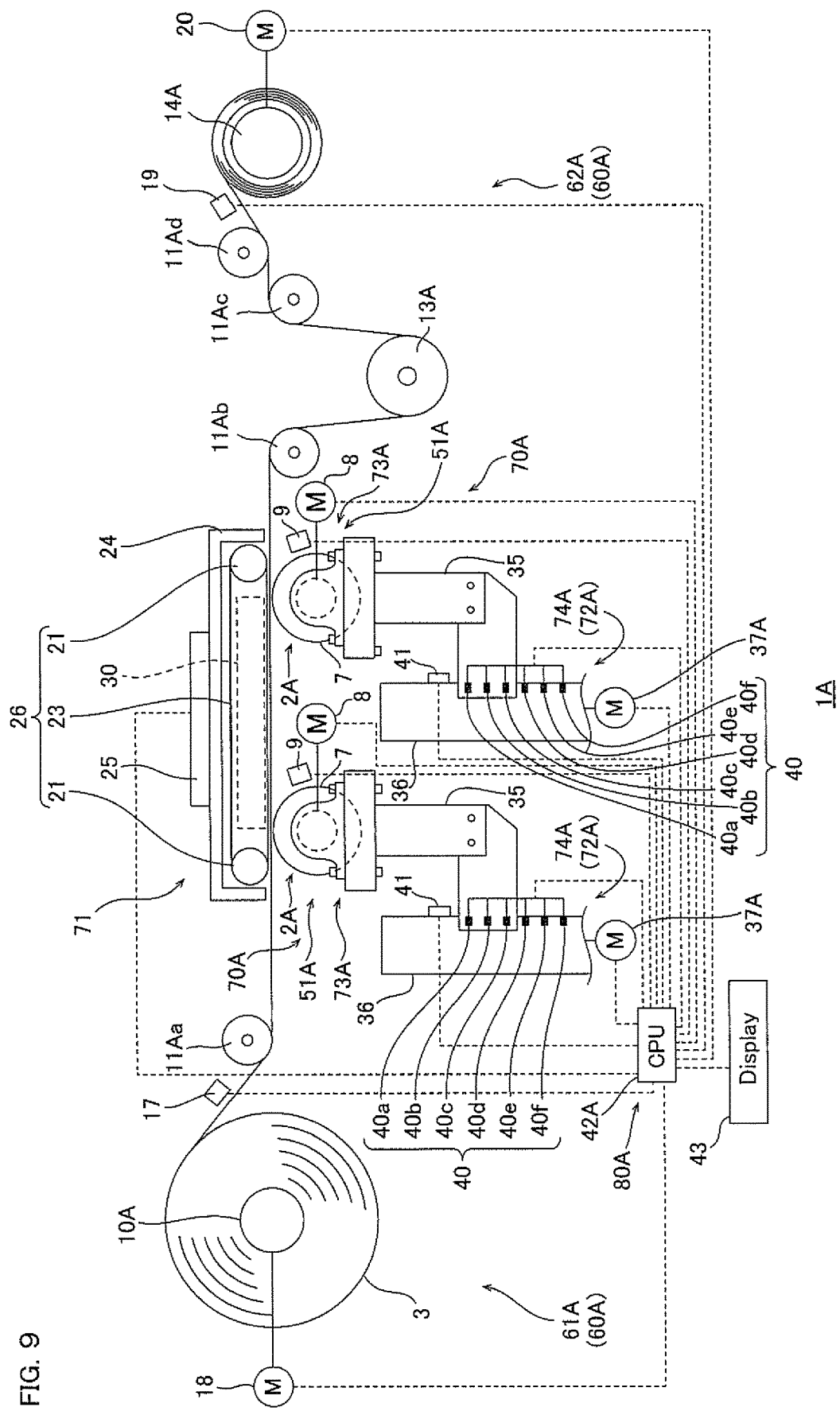
FIG. 9 is a schematic view showing the application apparatus when a plurality of pressing units is disposed in the first embodiment.

For example, in the first embodiment, as illustrated in FIG. 9, a plurality (two) of pressing force giving units 72 can be disposed with a space therebetween in the conveyance direction under the pressing force receiving unit 71.

Furthermore, in the application method, the plurality of solid brazing materials 7 is entirely or partially rotated and in contact with the aluminum plate material 3 being conveyed.

Because the plurality of solid brazing materials 7 is in contact with the aluminum plate material 3 being conveyed, a large amount of the solid brazing material 7 is applied. Alternatively, when the amount of application of the solid brazing material 7 is kept constant, the rate of reduction in each of the solid brazing materials 7 decreases. Thus, each of the solid brazing materials 7 can be used longer. This makes the maintenance of the application apparatus 1A easy.

Alternatively, in the first embodiment and the second embodiment, a plurality of pressing force giving units 72 is disposed with spaces therebetween above the aluminum plate material 3 in the conveyance direction.

In such a case, the pressing force receiving unit 71 is disposed under the aluminum plate material 3.

Furthermore, in the first embodiment and the second embodiment, the load cell 25 is disposed in the pressing force receiving unit 71. However, the load cell 25 can be disposed in the pressing force giving unit 72.

Alternatively, the plurality of pressing force giving units 72 can be disposed with spaces therebetween in the conveyance direction on both upper and lower sides of the aluminum plate material 3. Further, the pressing force giving units 72 on the upper and lower sides face each other so that the application to both upper and lower sides of the aluminum plate material 3 can simultaneously be carried out. In such a case, the load cell 25 is disposed in the pressing force giving unit 72.

Furthermore, in the first embodiment and the second embodiment, the solid brazing material 7 rotates so that the rotation direction in which the solid brazing material 7 rotates and the conveyance direction in which the aluminum plate material 3 is conveyed are the same at the contact part at which the solid brazing material 7 is in contact with the aluminum plate material 3. However, the solid brazing material 7 can rotate in the reverse direction.

When the solid brazing material 7 rotates so that the rotation direction of the solid brazing material 7 and the conveyance direction of the aluminum plate material 3 are opposite at the contact part of the solid brazing material 7 with the aluminum plate material 3, the rotation of the solid brazing material 7 increases the amount of application of the solid brazing material 7. Thus, ever when the contact area of the solid brazing material 7 with the aluminum plate material 3 is small, the amount of application can be increased.

In such a case, preferably, the velocity ratio is controlled to satisfy the following expression (2).

$$\text{the velocity ratio} = (\text{the amount of application}/A) - 1 \qquad (2)$$

(In the expression, A satisfies $0 < A \leq 70$. The unit of A and the amount of application is $g/m^2$.) Specifically, the velocity ratio is, for example, more than 0, preferably 0.1 or more, more preferably 0.5 or more, even more preferably 1.0 or more, particularly preferably 2.0 or more and, for example, 99 or less, preferably 59 or less, more preferably 19 or less.

Preferably, the solid brazing material 7 rotates so that the rotation direction of the solid brazing material 7 and the conveyance direction of the aluminum plate material 3 are the same at the contact part of the solid brazing material 7 with the aluminum plate material 3.

In this manner, the frictional force at the contact part of the solid brazing material 7 with the aluminum plate material 3 decreases and the running stability is improved.

Furthermore, in the first embodiment and the second embodiment, the long aluminum plate material 3 is used as the workpiece. However, not only a plate but also, for example, a flat tube having an application part that is flat and can be rolled up can be used as the workpiece.

In the first embodiment and the second embodiment, the single pressing force receiving unit 71 is disposed. However, the number of the pressing force receiving units 71 is not especially limited. A plurality of pressing force receiving units 71 can be disposed with spaces therebetween in the conveyance direction, facing the pressing force giving unit 72.

Furthermore, in the first embodiment and the second embodiment, the endless belt mechanism 26 includes the pair of endless belt rollers 21 and the endless belt 23 wrapped around the pair of endless belt rollers 21. However, the endless belt mechanism 26 can further include an application board 30 (see the broken line in FIG. 1) or one or more rollers (not illustrated) between the pair of endless belt rollers 21. In this manner, the adjustability and accuracy of the pressing force receiving unit 71 are further increased.

Furthermore, in the first embodiment and the second embodiment, the control unit 42 controls the pressing force based on the pressing force detected by the load cell 25 by driving the hoisting and lowering motor 37 so that the roll-shaped brazing material 2 is pressed to the aluminum plate material 3 at a constant pressing force. However, the control unit 42 can move the pressing force receiving unit 71 or the application board 30 or roller (not illustrated) in the pressing force receiving unit 71 to control the pressing force based on the pressing force detected by the load cell 25.

Each of the members (mechanical components) described in the first embodiment and the second embodiment is not limited to the member in the embodiments and can be replaced with a known member. For example, in the first embodiment, in place of the optical sensor unit 40, an encoder is used to detect the position of the support arm 35 of the hoisting and lowering mechanism 36 in the up-down direction.

Furthermore, in the first embodiment and the second embodiment, to regulate the temperature of the solid brazing material 7, the application apparatus 1 can be disposed in a casing regulated at a predetermined temperature.

Furthermore, in the first embodiment and the second embodiment, the application unit 70 can include an X-ray fluorescence spectrometer 90 as an application amount detecting means.

For example, in the second embodiment, as illustrated with a dotted line in FIG. 4, the X-ray fluorescence spectrometer 90 is disposed between the application unit 70B and the second guide roller 11Bb below the aluminum plate material 3.

The X-ray fluorescence spectrometer 90 is a known X-ray fluorescence spectrometer and delivers electron rays or X rays to the lower surface (to which the solid brazing material 7 is applied) of the aluminum plate material 3 transmitted from the application unit 70B, and detects the fluorescence X-rays from the aluminum plate material 3, thereby detecting the amount of application of the solid brazing material 7 from the detected intensity of a desired element.

The X-ray fluorescence spectrometer 90 is electrically connected to the control unit B.

In such a case, the control unit 42B keeps the conveyance velocity of the aluminum plate material 3 at a constant velocity by controlling the drive of the conveyance motor 83 based on the amount of application of the solid brazing material 7 detected by the X-ray fluorescence spectrometer 90, and/or keeps the circumferential velocity of the roll-shaped brazing material 2B at a constant velocity by controlling the drive of the application motor 8, and/or controls the pressing force by driving the hoisting and lowering motor 37B so that the roll-shaped brazing material 2B is pressed to the aluminum plate material 3 at a constant pressing force.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The application method of the solid brazing material, production method of the coated workpiece, application apparatus, and roll-shaped solid brazing material of the present invention are suitably used for the production of aluminum or aluminum alloy products such as a heat exchanger.

DESCRIPTION OF REFERENCE NUMERALS 1 application apparatus
2 roll-shaped solid brazing material
3 aluminum plate material
6 rotating shaft
7 solid brazing material
9 third circumferential velocity sensor
25 load cell
40 optical sensor unit
41 mechanical switch
42 control unit
50 rotating unit
60 conveyance unit
63 connection portion
74 pressing portion
90 X-ray fluorescence spectrometer

The invention claimed is:

1. A method of applying a solid brazing material comprising:
   applying the solid brazing material to a workpiece by bringing the solid brazing material into contact with the workpiece being conveyed while rotating the solid brazing material, wherein at a point of contact at which the solid brazing material is in contact with the workpiece, the solid brazing material has a roll shape.

2. The method according to claim 1, wherein
   (i) the solid brazing material moves in a direction opposite to a conveyance direction of the workpiece at the point of contact or
   (ii) the solid brazing material moves in a direction identical to the conveyance direction of the workpiece at the point of contact, and a velocity ratio of a circumferential velocity of the solid brazing material to a conveyance velocity of the workpiece (the circumferential velocity of the solid brazing material/the conveyance velocity of the workpiece) is more than 0 and less than 1, or more than 1.

3. The method according to claim 2, wherein
   (i) the solid brazing material moves in the direction identical to the conveyance direction of the workpiece at the point of contact and a velocity ratio satisfies a following expression (1), or (ii) the solid brazing material moves in the direction opposite to the conveyance direction of the workpiece at the point of contact and the velocity ratio satisfies a following expression (2), $$\text{velocity ratio} = (\text{amount of application}/A) + 1 \quad (1)$$

$$\text{velocity ratio} = (\text{amount of application}/A) - 1 \quad (2)$$

in the expressions, A satisfies $0 < A \leq 70$, and a unit of A and the amount of application is $g/m^2$.

4. The method according to claim 1, wherein during the applying, in response to reduction in a thickness of the solid brazing material to be applied to the workpiece, a rotating velocity of the solid brazing material is increased and/or a conveyance velocity of the workpiece is decreased.

5. The method according to claim 1, wherein a plurality of solid brazing materials is disposed, at least one of the plurality of the solid brazing materials is rotated and the plurality of the solid brazing materials is simultaneously brought into contact with the workpiece being conveyed to apply the solid brazing material to the workpiece.

6. The method according to claim 1, wherein the solid brazing material comprises a fluoride flux and wax.

7. The method according to claim 6, wherein the solid brazing material further comprises an organic viscosity reducing agent or a film leveling auxiliary agent.

8. The method according to claim 6, wherein the solid brazing material is produced by mixing the fluoride flux and the wax to obtain a mixture, and pouring and cooling the mixture in a roll-shaped mold with a rotating shaft set in a central part thereof.

9. The method according to claim 1, wherein at a point of contact at which the solid brazing material is in contact with the workpiece, the solid brazing material rotates around a central axis.

* * * * *